US012401600B2

(12) United States Patent
Sarkar et al.

(10) Patent No.: US 12,401,600 B2
(45) Date of Patent: Aug. 26, 2025

(54) SYSTEMS AND METHOD FOR IMPROVING NETWORK TRAFFIC

(71) Applicant: U.S. Bancorp, National Association, Minneapolis, MN (US)

(72) Inventors: Souvik Sarkar, Monroe Township, NJ (US); Michael Hunter, Rosemount, MN (US); Adam Carter, Stillwater, MN (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 554 days.

(21) Appl. No.: 17/875,958

(22) Filed: Jul. 28, 2022

(65) Prior Publication Data

US 2024/0039857 A1 Feb. 1, 2024

(51) Int. Cl.
*H04L 47/2475* (2022.01)
*G06Q 20/02* (2012.01)
*H04L 43/0882* (2022.01)
*H04L 47/10* (2022.01)

(52) U.S. Cl.
CPC ......... *H04L 47/2475* (2013.01); *G06Q 20/02* (2013.01); *H04L 43/0882* (2013.01); *H04L 47/29* (2013.01)

(58) Field of Classification Search
CPC ..................................................... G06Q 20/02
See application file for complete search history.

(56) References Cited

U.S. PATENT DOCUMENTS

| | | | | |
|---|---|---|---|---|
| 2020/0052881 | A1* | 2/2020 | Hwang | H04L 9/06 |
| 2022/0067674 | A1* | 3/2022 | Yan | G06Q 20/04 |
| 2022/0230169 | A1* | 7/2022 | Stollman | G06Q 20/40 |
| 2023/0359984 | A1* | 11/2023 | Ngo | G06Q 10/08 |

OTHER PUBLICATIONS

Jepsen, et al., in "In-Network Support for Transaction Tagging," from Proceedings of the VLDB Endowment, vol. 14, Issue 9, 2021 (Year: 2021).*

* cited by examiner

*Primary Examiner* — Mike Anderson
*Assistant Examiner* — Brandon M Duck
(74) *Attorney, Agent, or Firm* — FOLEY & LARDNER LLP

(57) ABSTRACT

A method comprises receiving a transaction request comprising an identification of a sending account, an identification of a recipient account, and a value; comparing the value to a threshold identified in one or more rules; identifying a transaction protocol based on the comparing; selecting a first subset of computers of a plurality of subsets of computers based on the identified transaction protocol, each of the plurality of subsets of computers corresponding to a different transaction protocol; and transmitting a message to each computer of the first subset of computers indicating the transaction request, receipt of the message causing each computer of the first subset of computers to complete a transaction corresponding to the transaction request between the sending account and the recipient account.

16 Claims, 13 Drawing Sheets

500

Sending a single payment has never been easier.

Welcome to the new Payer Choice. Once you've entered your information, our intelligent routing system provides the fastest option for you from RTP, Same Day ACH, or ACH. In the months ahead, we'll be expanding Payer Choice to include wire transfers and other payment options.

PAYER ACCOUNT — 504

[ Number-name Agronomy checking ▾ ]   The available payment methods for this account are: RTP, Same Day ACH, or ACH.

Amount* — 502
$1,000,000.00

PAYEE ACCOUNT — 506

Name*
Test name

Number*
123456789

Routing and transit*
123456789

Your payment options — 508

◉ Take me to the fastest option

○ Take me to the cheapest option

○ If possible, show me all the options

Your fastest payment option is ACH

Based on your information, our A.I. recommends ACH as your quickest payment method. To proceed, complete the fields below. To edit your information, select Back.

Payer account

Number - Name
153695187291 - Agronomy Checking

Amount
$1,000,000.00

Payee account

Name*
Test name

Number*
123456789

Routing and transit*
123456789

Payment details

ACH company ID*
1770592510 ⌄

SEC code* ⌄

Batch name* ⌄

Effective date
11/02/2020

Receiver account type ⌄

Company name
COLUMBIA GRAIN

Default transaction type
Credit

Company entry description
ACH ITEM

Back  [ Continue ] — 516

FIG. 5B

Create Invoice

First Name: Zach
Last Name: Brenner
Order number: 765543

Model Number: 212-789-0123
Email: zabrenner83@gmail.com
Amount due: USD 1,234.56

Due date: July 23, 2021
Memo: Downpayment
Receiving account >

Optional

[Create Invoice]  [Clear]

SYSTEMS AND METHOD FOR IMPROVING NETWORK TRAFFIC

BACKGROUND

Transaction infrastructures can often be overburdened with network traffic as different organizations perform transactions through the infrastructures. For example, for a typical transaction, a server may receive a transaction request for the transaction and identify a value and the accounts involved with the transaction. The server may then automatically send messages to different computing devices of a predetermined transaction infrastructure to complete the transaction. Such transactions may be performed through the same transaction infrastructure by multiple servers all over the world. Given the sheer number of servers that may transmit transaction messages to the computers of the transaction infrastructure and the amount of processing power processing the transactions may require, this process can overburden the processing resources of computers as the computers facilitate the transactions. Accordingly, there may be a significant amount of latency involved in processing any single transaction resulting from the lack of processing resources of the computers and/or the substantial amount of network traffic involved in processing each of the transactions.

SUMMARY

At least one aspect of a technical solution to the aforementioned problem is directed to a method for improving network traffic. The method may comprise receiving, by a processor, a transaction request comprising an identification of a sending account, an identification of a recipient account, and a value; comparing, by the processor, the value to a threshold identified in one or more rules; identifying, by the processor, a transaction protocol based on the comparing; selecting, by the processor, a first subset of computers of a plurality of subsets of computers based on the identified transaction protocol, each of the plurality of subsets of computers corresponding to a different transaction protocol; and transmitting, by the processor, a message to each computer of the first subset of computers indicating the transaction request, receipt of the message causing each computer of the first subset of computers to complete a transaction corresponding to the transaction request between the sending account and the recipient account.

In some embodiments, the method further comprises establishing, by the processor, one or more connections with the first subset of computers prior to the transaction request; and selecting, by the processor, the one or more connections between the processor and the first subset of computers responsive to selecting the first subset of computers.

In some embodiments, the method further comprises identifying, by the processor, a timestamp of the transaction request; and identifying, by the processor, a number of network packets the processor transmitted across the one or more connections between the processor and the first subset of computers within a defined time period comprising a time of the timestamp, wherein identifying the transaction protocol comprises identifying, by the processor, the transaction protocol responsive to determining the number of network packets the processor transmitted across the one or more connections is less than a second threshold.

In some embodiments, the transaction protocol is a first transaction protocol, and further comprising identifying, by the processor, a percentage of network packets the processor transmitted across second one or more connections between the processor and a second subset of computers of the plurality of subsets of computers; and determining, by the processor, the identified percentage of network packets is above a second threshold, wherein identifying the first transaction protocol comprises identifying, by the processor, a second transaction protocol; and adjusting, by the processor, the identified second transaction protocol from the second transaction protocol to the first transaction protocol in response to the determining the identified percentage of network packets is above the second threshold.

In some embodiments, the transaction protocol is a first transaction protocol, further comprising identifying, by the processor, a percentage of network packets the processor transmitted across the connections between the processor and each of a second subset of computers of the plurality of computers; determining, by the processor, the identified percentage of network packets is below a second threshold, responsive to the determining the identified percentage of network packets is below the second threshold, determining, by the processor, a total number of network packets the processor transmitted across the connections between the processor and each of the second subset of computers is above a third threshold; wherein identifying the first transaction protocol comprises identifying, by the processor, a second transaction protocol; and adjusting, by the processor, the identified second transaction protocol from the second transaction protocol to the first transaction protocol in response to the determining the total number of network packets is above the third threshold.

In some embodiments, the method further comprises identifying, by the processor, a percentage of network packets the processor transmitted across connections between the processor and each of the first subset of computers of the plurality of computers; determining, by the processor, the identified percentage of network packets is below a second threshold; and responsive to the determining the identified percentage of network packets is below the second threshold, determining, by the processor, a total number of network packets the processor transmitted across the connections between the processor and each of the first subset of computers is below a third threshold, wherein identifying the transaction protocol comprises identifying, by the processor, the transaction protocol responsive to determining the total number of network packets the processor transmitted across the connections between the processor and each of the first subset of computers is below the third threshold.

In some embodiments, the method further comprises rendering, by the processor, a graphical user interface on a computer device associated with the sending account, the graphical user interface comprising one or more selectable options each indicating an attribute of the transaction request; and receiving, by the processor, a selected option of the one or more selectable options, wherein comparing the value to the threshold identified in the one or more rules comprises retrieving, by the processor, the one or more rules from memory responsive to the one or more rules having a stored association with the selected option.

In some embodiments, the method further comprises identifying, by the processor, a timestamp of the transaction request; and comparing, by the processor, the timestamp to one or more time periods of the one or more rules, wherein identifying the transaction protocol comprises identifying, by the processor, the transaction protocol responsive to the timestamp falling outside of the one or more time periods. In some embodiments, the method further comprises rendering, by the processor, an identifier of the transaction protocol on a display of a computing device; and receiving, by the processor, a selection of the identifier of the transaction protocol from the computing device, wherein selecting the first subset of computers comprises selecting, by the processor, the first subset of computers responsive to receiving the selection of the identifier from the computing device.

In some embodiments, the method further comprises labeling, by the processor, a feature vector comprising data regarding the transaction request comprising at least the value with an indication of the selection of the identifier; and training, by the processor, a machine learning model to predict transaction protocols using the labeled feature vector. In some embodiments, the transaction protocol is a first transaction protocol, the method may further comprise determining, by the processor, a system of record storing the recipient account is not in communication with a second subset of computers of the plurality of subsets of computers, the second subset of computers associated with a second transaction protocol, wherein identifying the first transaction protocol comprises identifying the first transaction protocol responsive to the determining the system of record is not in the communication with the second subset of computers.

Another aspect of a technical solution to the aforementioned technical problem relates to a system. The system may comprise one or more processors configured by machine-readable instructions to receive a transaction request comprising an identification of a sending account, an identification of a recipient account, and a value; compare the value to a threshold identified in one or more rules; identify a transaction protocol based on the comparison; select a first subset of computers of a plurality of subsets of computers based on the identified transaction protocol, each of the plurality of subsets of computers corresponding to a different transaction protocol; and transmit a message to each computer of the first subset of computers indicating the transaction request, receipt of the message causing each computer of the first subset of computers to complete a transaction corresponding to the transaction request between the sending account and the recipient account.

In some embodiments, the one or more processors are further configured to establish one or more connections with the first subset of computers prior to the transaction request; and select the one or more connections between the processor and the first subset of computers responsive to selecting the first subset of computers. In some embodiments, the one or more processors are further configured to identify a timestamp of the transaction request; and identify a number of network packets the processor transmitted across the one or more connections between the processor and the first subset of computers within a defined time period comprising a time of the timestamp, wherein the one or more processors are configured to identify the transaction protocol by identifying the transaction protocol responsive to determining the number of network packets the processor transmitted across the one or more connections is less than a second threshold.

In some embodiments, the transaction protocol is a first transaction protocol, and wherein the one or more processors are further configured to identify a percentage of network packets the processor transmitted across second one or more connections between the processor and a second subset of computers of the plurality of subsets of computers; and determine the identified percentage of network packets is above a second threshold, wherein the one or more processors are configured to identify the first transaction protocol by identifying a second transaction protocol; and adjusting the identified second transaction protocol from the second transaction protocol to the first transaction protocol in response to the determination that the identified percentage of network packets is above the second threshold.

In some embodiments, the transaction protocol is a first transaction protocol, and wherein the one or more processors are further configured to identify a percentage of network packets the processor transmitted across the connections between the processor and each of a second subset of computers of the plurality of computers; determine the identified percentage of network packets is below a second threshold; and responsive to the determining the identified percentage of network packets is below the second threshold, determine a total number of network packets the processor transmitted across the connections between the processor and each of the second subset of computers is above a third threshold; wherein the one or more processors are configured to identify the first transaction protocol by identifying a second transaction protocol; and adjusting the identified second transaction protocol from the second transaction protocol to the first transaction protocol in response to the determination that the total number of network packets is above the third threshold.

In some embodiments, the one or more processors are further configured to identify a percentage of network packets the processor transmitted across connections between the processor and each of the first subset of computers of the plurality of computers; determine the identified percentage of network packets is below a second threshold; and responsive to the determination that the identified percentage of network packets is below the second threshold, determine a total number of network packets the processor transmitted across the connections between the processor and each of the first subset of computers is below a third threshold; wherein the one or more processors are configured to identify the transaction protocol by identifying the transaction protocol responsive to determining the total number of network packets the processor transmitted across the connections between the processor and each of the first subset of computers is below the third threshold.

In some embodiments, the one or more processors are further configured to render a graphical user interface on a computer device associated with the sending account, the graphical user interface comprising one or more selectable options each indicating an attribute of the transaction request; and receive a selected option of the one or more selectable options, wherein the one or more processors are configured to compare the value to the threshold identified in the one or more rules by retrieving the one or more rules from memory responsive to the one or more rules having a stored association with the selected option.

Another aspect of a technical solution to the aforementioned technical problem relates to a non-transitory computer-readable storage medium having instructions embodied thereon, the instructions being executable by one or more processors to perform a method. The method may comprise receiving a transaction request comprising an identification of a sending account, an identification of a recipient account, and a value; comparing the value to a threshold identified in one or more rules; identifying a transaction protocol based on the comparing; selecting a first subset of computers of a plurality of subsets of computers based on the identified transaction protocol, each of the plurality of subsets of computers corresponding to a different transaction protocol; and transmitting a message to each computer of the first subset of computers indicating the transaction request, receipt of the message causing each computer of the first subset of computers to complete a transaction corresponding to the transaction request between the sending account and the recipient account. In some embodiments, the method further comprises establishing one or more connections with the first subset of computers prior to the transaction request; and selecting the one or more connections between the processor and the first subset of computers responsive to selecting the first subset of computers.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5A is an illustration of a user interface for selecting an attribute of a transaction, in accordance with an implementation;

FIG. 5B is an illustration of a user interface for displaying a determined transaction protocol according to the selected attribute of FIG. 5A, in accordance with an implementation;

FIG. 6 is an illustration of a user interface for displaying a record of a transaction, in accordance with an implementation;

DETAILED DESCRIPTION

Figure 1:
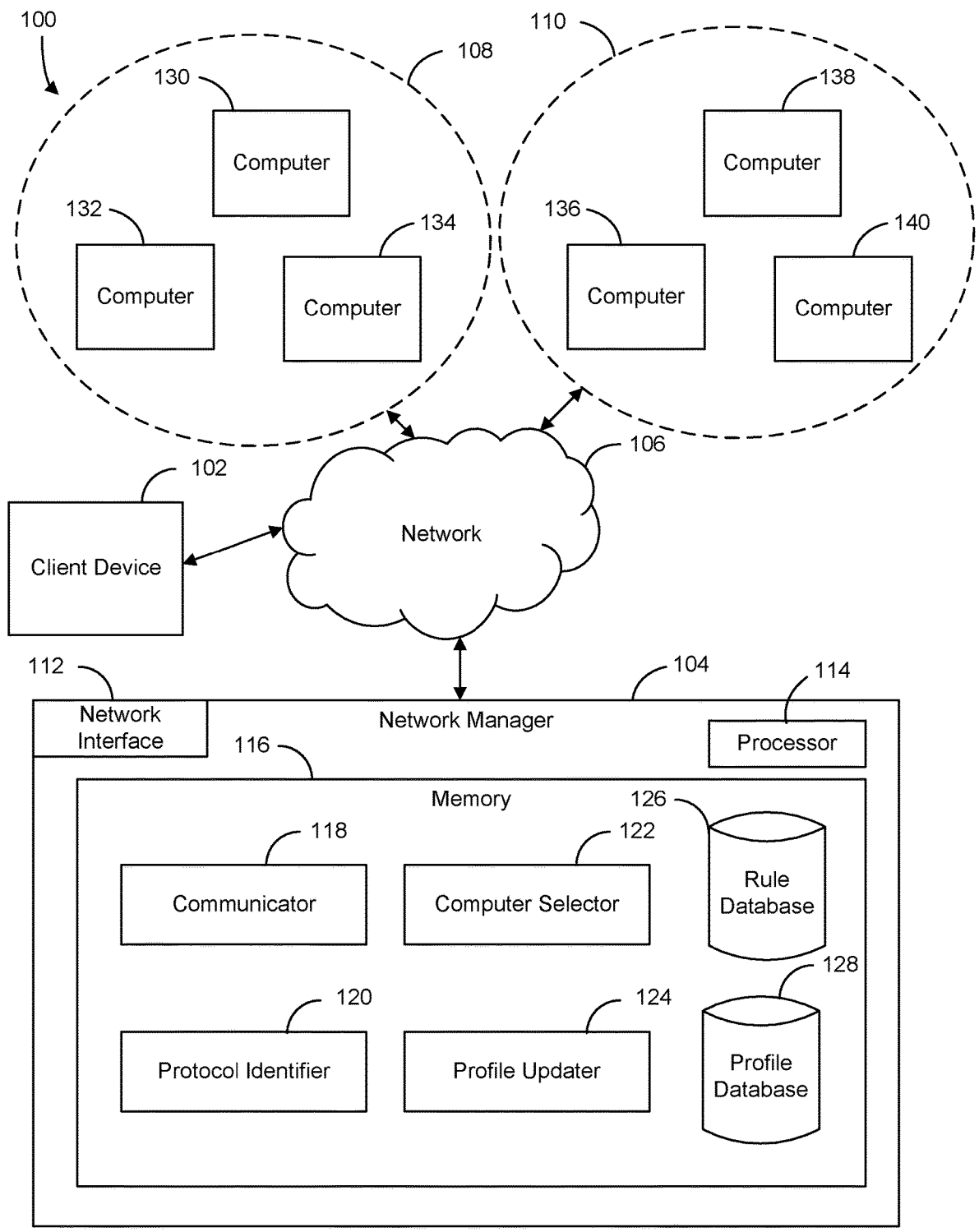
FIG. 1 is an illustration of an example system for reducing network traffic, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, transaction infrastructures can often be overburdened with network traffic as different organizations perform transactions through the infrastructures. For example, a system may be configured to only interact with a single transaction infrastructure to facilitate transactions. In doing so, the computers within the systems may establish connections with the different computers of the transaction infrastructure. When any computers within the system receive a request to perform or facilitate a transaction, the computers may send messages to the computers of the financial infrastructure to complete the transaction. By operating in this manner in which each computer of the system communicates with the computers of the transaction infrastructure, the system can overburden the computers of the financial infrastructure with requests and messages. The requests and messages can cause the computers of the financial infrastructure to lose their connections with other systems and/or use a significant amount of resources to facilitate transactions that are associated with the transaction requests. This problem can increase when multiple computer systems establish connections with and communicate with computers of the financial infrastructure at the same time, each system generating network traffic and/or causing the financial infrastructure to use computational resources. Accordingly, computer systems in communication with the financial infrastructure may incur a significant amount of latency and/or processing resources on the computers of the financial infrastructure.

Implementations of the systems and methods discussed herein overcome these technical deficiencies because they provide a method for limiting the amount of network traffic and reducing the transaction processing rate of computers of any individual financial infrastructure. A computer implementing the systems and methods described herein can do so by establishing connections with computers of multiple transaction infrastructures at once. The computer can implement a set of rules for identifying which financial infrastructure to use to facilitate transactions on a per-transaction basis (e.g., the computer can apply the set of rules for each transaction request the computer receives). The computer can implement the set of rules based on different attributes of a transaction or transaction request. The rules can involve determining the financial infrastructure to which to transmit messages for a transaction based on a speed of completion of the transaction, a cost of the transaction, a number of network packets the computer or a system with which the computer is associated has transmitted, etc., for different financial infrastructures. The computer can evaluate a transaction according to such rules and select a subset of computers of a financial structure to which to transmit data for the transaction according to the set of rules. The computer may transmit messages containing data for different transactions to different subsets of computers depending on the financial infrastructures the computer selects. In this way, the computer can distribute the messages and signals the computer distributes to different subsets of computers as the computer receives transaction requests for transactions over time. Thus, the computer can minimize the amount of network traffic and processing resources the computer induces on any single subset of computers of a financial infrastructure.

In some instances, the computer implementing the systems and methods described herein can implement rules that are specific to the computer networks (e.g., subsets of computers) of the different financial infrastructures. For example, one financial infrastructure can have one limit to the amount of messages computers of the financial infrastructure can receive from a system of computers and another financial infrastructure can have another limit. Such limits may be imposed based on the computing resources the different financial infrastructures have or the number of computer systems with which the financial infrastructures have established connections. In another example, the computer can be limited by time windows that are specific to the different financial infrastructures. For instance, computers of one financial infrastructure can be configured to only receive messages during one time frame while computers of another financial infrastructure can be configured to only receive messages during another time frame. The computer can implement such rules to ensure the computer can remain in compliance with and send messages to the computer networks of the different financial infrastructures.

FIG. 1 illustrates an example system 100 for improving network traffic, in some embodiments. In brief overview, system 100 can include a client device 102 that communicates with a network manager 104 over a network 106. Client device 102 can do so by transmitting network manager 104 transaction requests. Client device 102 can transmit network manager 104 attributes for the transaction request. Network manager 104 can receive the transaction request and/or the attributes for the transaction request and select a subset of computers (e.g., subsets of computers 108 or subsets of computers 110) that are associated with a particular transaction protocol (e.g., a particular financial infrastructure) based on the transaction attributes. Network manager 104 can transmit messages to the subset of computers to complete a transaction that corresponds to the transaction request. These components may operate together to facilitate transactions. System 100 may include more, fewer, or different components than shown in FIG. 1. For example, there may be any number of client devices, computers that make up or are a part of network manager 104 or networks in system 100.

Client device 102, network manager 104, subset of computers 108, and subset of computers 110 can include or execute on one or more processors or computing devices and/or communicate via network 106. Network 106 can include computer networks such as the Internet, local, wide, metro, or other area networks, intranets, satellite networks, and other communication networks such as voice or data mobile telephone networks. Network 106 can be used to access information resources such as web pages, websites, domain names, or uniform resource locators that can be presented, output, rendered, or displayed on at least one computing device (e.g., client device 102), such as a laptop, desktop, tablet, personal digital assistant, smartphone, portable computers, or speaker. For example, via network 106, client device 102 can transmit transaction requests to the network manager 104 and network manager 104 can select subsets of computers of different transaction protocols to facilitate transactions.

Client device 102 and/or network manager 104 can include or utilize at least one processing unit or other logic devices such as a programmable logic array engine or a module configured to communicate with one another or other resources or databases. As described herein, computers can be described as computers, computing devices, or client devices. Client device 102 may contain a processor and a memory. The components of client device 102 and network manager 104 can be separate components or a single component. System 100 and its components can include hardware elements, such as one or more processors, logic devices, or circuits.

Subsets of computers 108 and 110 may each include computers similar to client device 102 and/or network manager 104. For example, subset of computers 108 can include computers 130, 132, and 134. Subset of computers 110 can include computers 136, 138, and 140. Each of computers 130, 132, 134, 136, 138, and 140 can include the same or similar components to client device 102 and/or network manager 104. Subsets of computers 108 and 110 may each correspond to a different transaction protocol (e.g., ACH, RTP, RFP, SDACH, Wires, different blockchain infrastructures, etc.). One example of a transaction protocol may be an online check payment, as described in U.S. patent application Ser. No. 16/700,272, filed Dec. 2, 2019, the entirety of which is incorporated by reference herein. The individual subsets of computers may be configured to receive messages for transactions from different computing devices and communicate with each other and/or other process data for the individual transactions to complete or facilitate the transactions. Each subset of computers may include any number of computers from one computer to many computers that can operate to complete the transactions.

Network manager 104 may comprise one or more processors that are configured to analyze and update entity profiles based on the entity profiles corresponding to individuals that are a part of the same group (e.g., reside in the same household). Network manager 104 may comprise a network interface 112, a processor 114, and/or memory 116. Network manager 104 may communicate with client device 102 and the computers of subsets of computers 108 and 110 via network interface 112, which may be an antenna or other network device that enables communication across a network and/or with other devices. Processor 114 may be or include an ASIC, one or more FPGAs, a DSP, circuits containing one or more processing components, circuitry for supporting a microprocessor, a group of processing components, or other suitable electronic processing components. In some embodiments, processor 114 may execute computer code or modules (e.g., executable code, object code, source code, script code, machine code, etc.) stored in memory 116 to facilitate the activities described herein. Memory 116 may be any volatile or non-volatile computer-readable storage medium capable of storing data or computer code.

Memory 116 may include a communicator 118, a protocol identifier 120, a computer selector 122, a profile updater 124, a rule database 126, and a profile database 128, in some embodiments. In brief overview, components 118-128 may cooperate to receive a transaction request and attributes for the transaction request from a computing device, apply rules to the transaction request, identify a transaction protocol based on the application of the rules, select a subset of computers that correspond to the transaction protocol to facilitate a transaction for the transaction request, and transmit messages to the computers of the subset to facilitate the transaction.

Network manager 104 may store entity profiles in profile database 128. Entity profiles may be or include accounts for different individuals such as bank accounts, credit card accounts, user profiles with different websites, etc. The entity profiles may include attribute-value pairs that each include a different attribute and a value for the attribute. For example, the entity profiles may include attribute-value pairs for first name, last name, full name, address, phone number, cell phone number, home phone number, tax identification number, street name, zip code, city, state, account number, household identification number, group entity number, company identification number, etc. The entity profiles can also include values. Network manager 104 may initially store the entity profiles with attribute-value pairs with blank values in the data structures for the respective entity profiles. Network manager 104 may then add values to the attribute-value pairs as network manager 104 receives inputs (e.g., user inputs) indicating the values. Network manager 104 may add the values to the attribute-value pairs by updating the respective data structures with the values.

Profile database 128 may include one or more databases (e.g., databases in a distributed system). Profile database 128 may store profiles for different individual entities (e.g., individual people) and/or group entities (e.g., companies, households, organizations, etc.). The individual entity profile may be referred to hereafter as entity profiles or individual entity profiles and the group entity profiles as group entity profiles. The entity profiles may be stored as data structures with one or more attribute-value pairs as described above. The group entity profiles may similarly be stored as data structures with attribute-value pairs (e.g., name, address, phone number, number of members (e.g., employees), names of the members, number of people in the household, type of business, etc.). The different profiles that are stored in profile database 128 may be updated over time as network manager 104 either receives new values for the profiles or determines values for the profiles.

Communicator 118 may comprise programmable instructions that, upon execution, cause processor 114 to receive a transaction request from client devices (e.g., client device 102). Communicator 118 may be or include an application programming interface (API) that facilitates communication between network manager 104 and other computing devices. Communicator 118 may receive the transaction request from client device 102 across network 106.

Communicator 118 establishes connections with computers. Communicator 118 can establish the connections with the computers over a network. To do so, communicator 118 can communicate with the computers across the network. In one example, communicator 118 can transmit syn packets to the computers and establish the connections using a TLS handshaking protocol. Communicator 118 can use any handshaking protocol to establish connections with the computers.

When establishing the connections with computers, communicator 118 can establish connections with computers that correspond to (e.g., are associated with) different transaction protocols (e.g., that are a part of different financial infrastructures). For example, communicator 118 can establish connections with computers that are a part of different subsets of computers that operate to complete or otherwise facilitate transactions using different transaction protocols. Each subset of computers that corresponds to a transaction protocol can include one or more computers that communicate with each other and/or process messages to facilitate transactions. Each subset of computers may operate differently depending on the transaction protocol. For an example, for an ACH transaction protocol, a subset of computers may perform multiple verification checks to confirm of complete a transaction. For a blockchain-based transaction a subset of computers may operate to maintain a blockchain of records (e.g., blocks or block instances) for transactions. The subset of computers that maintain the blockchain may use the blockchain to facilitate a transaction. Because each transaction protocol may follow a different process for completing transactions and may have its own set of rules (e.g., network rules), each transaction protocol may facilitate transactions at different speeds and/or may complete different volumes of transactions within the same time period.

Communicator 118 can establish connections with the different subsets of computers corresponding to different transaction protocols prior to receiving a transaction request. Doing so may enable communicator 118 to select which subset of computers to transmit messages to complete a transaction upon receiving such a request in real-time. Because communicator 118 may have already established the connections with each of the subsets of computers, communicator 118 may communicate with computers of a particular subset of computers to perform a transaction that corresponds to a transaction request without taking time to establish connections with computers of the subset. Further, communicator 118 can maintain the connections and transmit messages for multiple connections to the different subsets of computers over the same connections over time. By establishing the connections and reusing the same connections to facilitate transactions over time, communicator 118 can avoid establishing connections for each request and thus reduce latency for any single transaction.

Communicator 118 receives a transaction request. The transaction request can include an identification of a sending account (e.g., a numeric or alphanumeric identifier), an identification of a recipient account (e.g., a numeric or alphanumeric identifier), and a value. In some cases, the transaction request may include an identification of a system of record (e.g., a computer) that hosts or stores accounts (e.g., the sending account or the recipient account). The transaction request may be a request to subtract the value from the sending account and add the value to the recipient account in a transaction. Communicator 118 can receive the transaction request from a computing device over a network. Computing device 102 may access a platform communicator 118 provides over the network and transmit the transaction request in a network packet or message to communicator 118 via the platform. For example, a user may access the user's account on the platform communicator 118 provides via a computing device. The user may select options on the platform that causes the user's account with the platform to transmit a transaction request to communicator 118 to subtract a value from the user's account as a sending account and to add the subtracted value to a recipient account.

In some embodiments, the transaction request can include attributes. The attributes may be inputs by a user indicating desired characteristics (e.g., a characteristic desired by the user) of the transactions for the transactions to be performed. For example, the attributes can be indications to identify a transaction protocol in which to complete a transaction based on a speed of the transaction, a cost (e.g., a processing cost) the transaction may incur, a type of the transaction (e.g., conventional or blockchain-based), etc. Communicator 118 can receive the attributes in the same or a different network packet as the transaction request that includes the identifications of the sending and recipient account and the value.

In one example, communicator 118 can render a graphical user interface on computing device 102 that includes one or more selectable options that each indicate an attribute of a transaction request. A user may select one of the selectable options from the one or more selectable options and computing device 102 may include the selected option in the data packet that includes the transaction request. Communicator 118 may receive the data packet including the selectable options and identify the attribute of the transaction request as the selected option.

Protocol identifier 120 may comprise programmable instructions that, upon execution, cause processor 114 to determine, identify, and/or select a transaction protocol for the transaction. Protocol identifier 120 can select rules. Protocol identifier 120 can select the rules by selecting a set of rules based on the attribute or attributes that are included in the transaction request. For example, protocol identifier 120 can store a set of speed rules, a set of cost rules, and a set of network rules in rule database 126 (e.g., a relational database). The speed rules and cost rules can be rules that compare different transaction protocols together. For example, the speed rules may indicate a comparison of the fastest transaction protocols and the cost rules may indicate the costs that the different transaction protocols may incur in completing transactions. The network rules may be rules that are specific to each transaction protocol such as time windows in which the computers associated with each transaction protocol can receive messages to complete transactions or maximum or minimum values of transactions that the subsets of computers may process. Protocol identifier 120 can select the set of rules to use to identify a transaction protocol from memory based on the attribute or attributes that are included in the transaction request.

Upon selecting the set of rules to use to identify a transaction protocol for a transaction, protocol identifier 120 can retrieve the set of rules from memory. Protocol identifier 120 may do so by querying memory using an identification of the set of rules as an index. Protocol identifier 120 can identify the set of rules that correspond to a matching value to the identification and retrieve the identified set of rules from memory.

Protocol identifier 120 can store and select any number of types of rules. For example, protocol identifier 120 can store and select the set of speed rules, the set of cost rules, and the set of network rules in rule database 126 (e.g., a relational database containing rules). Speed rules can be rules or an order indicating which transaction protocols complete transactions in the lowest amount of time or the fastest. For instance, the speed rules can indicate the order to be RTP, FedNow, SDACH, Wires, and then ACH. The speed rules can indicate any order and for any number of transaction protocols.

Cost rules can indicate the costs (e.g., processing resource costs) that transactions may incur when completing the transactions using different transaction protocols. For instance, the cost rules can indicate the order to be ACH, SDACH, RTP, FedNow, and then Wires. The cost rules can indicate any order and for any number of transaction protocols. In some cases, the cost rules may correspond to the processing resource costs incurred when processing transactions under the respective transaction protocols. For example, in some cases, higher cost transactions may require higher processing resources on the subset of computers that perform the transactions than lower cost transactions. Accordingly, the cost rules can include thresholds indicating maximum or minimum thresholds (e.g., threshold values) for individual transactions for the different transaction protocols. In some cases, the cost rules can include thresholds indicating maximum or minimum thresholds for an aggregate of transactions received from protocol identifier 120 within set time frames or a moving time window. For example, a subset of computers associated with a transaction protocol may only complete transactions with costs that, aggregated together, do not exceed a maximum threshold for a set time frame (e.g., a day) or a moving window time frame. By implementing such cost rules, protocol identifier 120 can avoid overburdening computers of transaction protocols with transactions that will incur too high of a cost (e.g., a cost above a threshold).

Network rules may be rules that are specific to the different transaction protocols. For example, the RTP transaction protocol may have rules that indicate the subset of computers associated with the RTP transaction protocol only completes transactions with values below a certain threshold (e.g., one million), a system of record hosting or storing the recipient account must have the RTP transaction protocol enabled in the system of record's settings or otherwise have established connections with the subset of computers associated with the RTP transaction protocol, and the RTP transaction protocol is not enabled or only enabled within a specific time frame (e.g., the RTP transaction protocol may not be implemented on Sundays between 2-6 AM). The ACH transaction protocol may have rules indicating that messages to the subset of computers that correspond to the ACH transaction protocol are to be sent in batches (e.g., batches at set time intervals) and that there are specific time windows to send such computers messages. The rules for SDACH may indicate transactions performed using the SDACH may include a limit (e.g., a maximum transaction value) that is lower than the regular ACH transaction protocol and a separate time window for protocol identifier 120 to transmit messages to the subset of computers associated with the SDACH transaction protocol (e.g., messages to the subset of computers associated with the SDACH transaction protocol may need to be sent before 12 PM). The rules for the wiring transaction protocol may indicate that wiring has a small or limited window in which transactions can be performed by the subset of computers associated with the transactions. Network rules for transaction protocols may include any number or type of such rules. Protocol identifier 120 may store network rules for any number of transaction protocols in memory such that protocol identifier 120 can retrieve and use the rules to select which transaction protocol to use to complete a transaction.

Protocol identifier 120 can select a set of network rules of a transaction protocol responsive to identifying the transaction protocol associated with the threshold that satisfies a speed rule or a cost rule, depending on the attribute included in the request. For example, if the attribute in the transaction request is an identification of a speed attribute (e.g., the request is to complete the transaction as fast as possible), protocol identifier 120 may identify the first transaction protocol as the fastest transaction protocol based on the set of speed rules protocol identifier 120 stored in memory. If the attribute in the transaction request is an identification of a cost attribute (e.g., the request is to complete the transaction while incurring the least amount of costs), protocol identifier 120 may identify the first transaction protocol as the lowest cost transaction protocol based on the set of cost rules protocol identifier 120 stored in memory. Protocol identifier 120 may then identify the set of network rules associated with the transaction protocol.

In some cases, protocol identifier 120 can retrieve a set of network rules and the set of rules that corresponds to the attribute of the transaction request (e.g., select the set of network rules and the set of speed rules or the set of cost rules) from memory. For example, after identifying either the speed or the cost attribute, protocol identifier 120 may retrieve the identified set of rules from memory. Protocol identifier 120 may apply the set of rules to determine which transaction protocol satisfies the set of rules (e.g., which transaction protocol is the fastest or which transaction protocol is the lowest cost). Protocol identifier 120 may determine the transaction protocol that satisfies the set of rules and retrieve the network rules that correspond to the identified transaction protocol. Protocol identifier 120 may then use the set of network rules to determine whether to use the transaction protocol to complete the transaction. In this way, protocol identifier 120 can identify a transaction protocol that complies with the attribute in the transaction request and that does not violate any network rules that are specific to the different transaction protocols.

Protocol identifier 120 compares the value to a threshold. For example, protocol identifier 120 may compare the value to a threshold of a network rule for the transaction protocol (e.g., a first transaction protocol) protocol identifier 120 identified as satisfying the set of speed rules or set of cost rules. Responsive to determining the value is less than the threshold, protocol identifier 120 may identify the transaction protocol as a transaction protocol to use to complete the transaction of the transaction request.

However responsive to determining the value exceeds the threshold, protocol identifier 120 can compare the value to a threshold of another transaction protocol. For example, if protocol identifier 120 determines the value exceeds the threshold, protocol identifier 120 can apply the set of speed rules or the set of cost rules to identify the next fastest or next lowest cost transaction protocol. Protocol identifier 120 can retrieve the set of network rules that corresponds to the identified transaction protocol and retrieve a threshold from the set of network rules. Protocol identifier 120 can compare the value of the transaction to the retrieved threshold. Responsive to determining the value is less than the threshold, protocol identifier 120 can identify the transaction protocol that corresponds to the threshold. Otherwise, protocol identifier 120 can repeat this process until identifying a transaction protocol that corresponds to a threshold that the value of the transaction request does not exceed.

In some embodiments, protocol identifier 120 may select the threshold after determining the subset of computers that correspond to the threshold are configured to receive transactions at a time of the transaction. For example, the different network rules may indicate time periods in which the subsets of computers for different transaction protocols can receive and/or process messages for transactions. Protocol identifier 120 may identify a timestamp for the transaction of the transaction request (e.g., a timestamp in which the transaction request was sent or received or a user input timestamp indicating a time to complete the transaction). Protocol identifier 120 may compare the time indicated by the timestamp to the time periods for the different transaction protocols and identify the transaction protocol responsive to the timestamp occurring outside of time periods in which other subsets of computers are configured to receive or process messages for transactions and/or responsive to the timestamp falling within a time period in which the subset of computers associated with the transaction protocol is configured to receive or process messages for transactions. Protocol identifier 120 may filter out any transaction protocols that are not configured to receive messages at the time of the timestamp. When apply the set of rules that correspond to the attribute of the transaction request, the protocol identifier 120 may not apply the rules to transaction protocols that have been filtered out.

To identify the transaction protocol, protocol identifier 120 can extract a string identifying the transaction protocol or label an identification of the transaction protocol to indicate the transaction protocol has been identified. In some cases, identifying the transaction protocol includes determining the transaction protocol is a potential transaction protocol to use to complete the transaction.

Protocol identifier 120 may determine if protocol identifier 120 has transmitted messages to the subset of computers associated with the identified transaction protocol for a number of transactions exceeding a threshold. Protocol identifier 120 can do so, for example, based on the number of network packets protocol identifier 120 has transmitted to the subset of computers or based on the number of transactions the subset of computers has completed. For instance, protocol identifier 120 may maintain a counter for each transaction protocol. Protocol identifier 120 may increment the counter for a transaction protocol in each instance in which protocol identifier 120 transmits messages for a transaction to a subset of computers that corresponds to the transaction protocol. Protocol identifier 120 can increment the counters over time to determine a total number of transactions for which protocol identifier 120 has transmitted messages to each subset of computers to complete transactions. Upon identifying a transaction protocol according to the set or sets of rules as described above, protocol identifier 120 may identify a count of the counter associated with the identified transaction protocol and compare the count to a threshold (e.g., a global threshold that applies to all transaction protocols or a threshold specific to the transaction protocol that the data processing retrieves from memory in response to identifying the transaction protocol). If the count of the counter exceeds the threshold, protocol identifier 120 can adjust or change the transaction protocol to use to complete the transaction.

In some cases, protocol identifier 120 may determine if the subset of computers associated with the identified transaction protocol have received an amount of network traffic exceeding a threshold within a time window (e.g., a defined time window). The time window may be a set time window (e.g., protocol identifier 120 may be configured to determine the number of transactions different subsets of computers perform at set intervals such as every hour, every day, every week, etc.) or a moving time window (e.g., protocol identifier 120 may be configured to determine the number of transactions different subsets of computers perform within a defined period of time previous (e.g., immediately previous) to the current time). Protocol identifier 120 may maintain and increment counters for the different transaction protocols for the different set time windows as protocol identifier 120 completes transactions through the transaction protocols (e.g., transmits messages for transactions to the subsets of computers of the transaction protocols to complete transactions) and/or maintain, increment, and decrement counters for the transaction protocols as protocol identifier 120 completes transactions and the times of the completed transactions fall out of the moving time window. Protocol identifier 120 may compare the counter for a time period including the current time or the moving time window to a threshold (e.g., a global threshold that applies to all transaction protocols or a threshold specific to the transaction protocol, as described above). If the count of the counter exceeds the threshold, protocol identifier 120 can adjust or change the transaction protocol to use to complete the transaction.

In one example, protocol identifier 120 can identify a timestamp of the transaction request (e.g., a timestamp in which the transaction request was sent or received or a user input timestamp indicating a time to complete the transaction). Protocol identifier 120 can identify a number of network packets protocol identifier 120 transmitted across the one or more connections between the processor and the subset of computers within a defined time period comprising a time of the timestamp (e.g., a count of a counter of the time window of the transaction or a multiple of the count that corresponds to the transaction protocol (e.g., the multiple may be the number of messages protocol identifier 120 may transmit the subset of computers to complete the transaction and may vary depending on the transaction protocol)). Protocol identifier 120 can compare the number of network packets to a threshold (e.g., a global threshold that applies to all transaction protocols or a threshold specific to the transaction protocol, as described above). If the number of network packets exceeds the threshold, protocol identifier 120 can adjust or change the transaction protocol to use to complete the transaction.

In some embodiments, protocol identifier 120 may determine whether the subset of computers is receiving too high of a percentage of messages to complete transactions compared to subsets of computers of other transaction protocols. For example, protocol identifier 120 may calculate a percentage of transactions for which protocol identifier 120 has transmitted messages to the subset of computers as compared to the subset of computers of other transaction protocols. Protocol identifier 120 may do so by comparing the counts of the counters protocol identifier 120 maintains as described above to a threshold. If the percentage exceeds the threshold (e.g., a global threshold that applies to all transaction protocols or a threshold specific to the transaction protocol, as described above), protocol identifier 120 can adjust or change the transaction protocol to use to complete the transaction. Accordingly, protocol identifier 120 may evenly distribute the computers to which to transmit network packets and not overload any single subset of computers with network packets or transactions to process.

In some embodiments, in addition to or instead of determining if the number of transactions the subset of computers associated with the identified transaction protocol have performed exceed a threshold, protocol identifier 120 can determine if a rate of the number of transactions the subset of computers have performed exceeds a threshold (e.g., a rate threshold). For example, protocol identifier 120 may store timestamps indicating the times protocol identifier 120s completed transactions using different transaction protocols. The timestamps may indicate the times in which protocol identifier 120 received transaction requests, the times in which computing devices transmitted transaction requests, the times in which protocol identifier 120 transmitted messages to subsets of computers to complete the transactions, and/or times in which protocol identifier 120 receives notifications that the transactions have been completed. Protocol identifier 120 may calculate a rate in which the subset of computers has completed transactions by identifying the number of timestamps protocol identifier 120 has stored for a time frame in which the end of the time frame is the current time and dividing the number by the length of the time frame. Protocol identifier 120 can compare the rate to a threshold (e.g., a global threshold that applies to all transaction protocols or a threshold specific to the transaction protocol, as described above). If the rate exceeds the threshold, protocol identifier 120 can adjust or change the transaction protocol to use to complete the transaction.

In some embodiments, instead of or in addition to determining whether protocol identifier 120 has transmitted too many transactions or transmitted transactions at too high of a rate, protocol identifier 120 may determine if the subsets of computers have received too many transactions or received transactions at too high of a rate. For example, the subset of computers may receive messages for transactions from multiple computer systems that are owned by separate entities and that each operate within their own local networks. The subset of computers may maintain counters and determine the rates in which the subset of computers receive such messages from each of the computer systems. The subset of computers may do so in a similar manner to how protocol identifier 120 can maintain counters for the transactions for which protocol identifier 120 transmits messages. Protocol identifier 120 can transmit a request to the subset of computers for the rates or total number of transactions the subset of computers performed and receive the requested data from the subset of computers. Protocol identifier 120 can compare the rates or the total number of transactions to a threshold (e.g., a global threshold that applies to all transaction protocols or a threshold specific to the transaction protocol, as described above). If the rate exceeds the threshold, protocol identifier 120 can adjust or change the transaction protocol to use to complete the transaction.

Protocol identifier 120 may iteratively apply the rules or processes described herein and filter out subsets of computers as options to complete a transaction if the subset does not complete any one rule. For example, protocol identifier 120 may determine whether to select or identify the transaction protocol associated with the subset of computers by first determining whether the percentage of total messages protocol identifier 120 has transmitted to the subset of computers exceeds a threshold. Responsive to determining the percentage exceeds the threshold, protocol identifier 120 may adjust the transaction protocol to use to complete the transaction. However, responsive to determining the percentage does not exceed the threshold, protocol identifier 120 may determine if the total number of messages protocol identifier 120 has transmitted to the subset of computers or the total number of messages the subset of computers has received exceeds a threshold to determine whether to adjust the transaction protocol. Protocol identifier 120 may apply any such rules in any order to filter out subsets of computers. In doing so, protocol identifier 120 may avoid using processing resources to calculate and compare the different iterations of rules for each subset and instead stop applying rules to the identified subset if the subset does not satisfy one or more rule or threshold, thus conserving processing resources.

In some embodiments, protocol identifier 120 may query the subsets of computers for an indication of whether the subset can process another transaction. If the subset of computers transmit an indication that no transaction can be performed (e.g., because the subset of computers has recently processed too many transactions or is processing transactions at too high of a rate (e.g., a rate above a threshold)), protocol identifier 120 can adjust or change the transaction protocol to use to complete the transaction. Accordingly, protocol identifier 120 may determine if the subset of computers of the identified transaction is currently processing transactions at too high of a rate to process another transaction and avoid transmitting messages for the transaction of the transaction request to the subset of computers.

In some embodiments, prior to determining if protocol identifier 120 has transmitted too many messages for too many transactions or the subset of computers has received too many messages for too many transactions, protocol identifier 120 may determine if the subset of computers is in communication with the system of record that stores the recipient account. For example, protocol identifier 120 may maintain (e.g., store) lists of systems of record (or their owners) with which the different subsets of computers are in communication. Protocol identifier 120 may identify the system of record or the owner of the system of record that stores the recipient account. Protocol identifier 120 may compare an identifier of the system of record or owner of the system of record to the list and identify the subsets of computers that are in communication with the system of record storing the recipient account. Protocol identifier 120 can remove (e.g., filter out) any subsets of computers (e.g., transaction protocols) as possibilities to complete the transaction because the subsets of computers do not have connections with the system of record and could not complete the transaction.

Protocol identifier 120 can adjust or change the transaction protocol by selecting a new transaction protocol to use to complete the transaction. For example, if protocol identifier 120 determines that the subset of computers does not have the processing capacity (e.g., memory resources) to complete the transaction for the transaction request, protocol identifier 120 may identify a new transaction protocol by performing the aforementioned process again but excluding the initially identified transaction protocol as an option. For example, protocol identifier 120 may generate a list of transaction protocols to apply the set of rules to containing transaction protocol A, transaction protocol B, transaction protocol C, and transaction protocol D. Protocol identifier 120 may have previously determined transaction protocol B could not be used to complete the transaction because the timestamp of the transaction was not within a time period in which computers of transaction protocol B were configured to receive messages. Protocol identifier 120 may determine the computers of transaction protocol C do not have the processing capacity to complete the transaction. Accordingly protocol identifier 120 may filter out or remove protocol B and D from the list and/or otherwise only apply the set of rules to transaction protocol A and C to identify a transaction protocol to complete the transaction. Protocol identifier 120 may then determine whether the subset of computers associated with the new transaction protocol have the processing capacity to handle the transaction of the transaction request. Protocol identifier 120 may repeat these operations until protocol identifier 120 identifies a transaction protocol that corresponds to a subset of computers that has the processing capacity to complete the transaction and/or that satisfies the set of rules that correspond to the attribute of the transaction request.

Protocol identifier 120 can render an identifier of the transaction protocol on a user interface. For example, protocol identifier 120 can generate a user interface including the identifier of the transaction protocol. Protocol identifier 120 can transmit the user interface to computing device 102 after computing device 102 transmitted the transaction request to protocol identifier 120. Computing device 102 may receive and display the user interface on a display to the user accessing computing device 102. In this way, protocol identifier 120 may indicate to the user the transaction protocol that protocol identifier 120 determined fits the attribute the user selected to be included with the transaction request.

For example, when generating the transaction request at the user interface, the user may select an option for protocol identifier 120 to complete a transaction using the fastest transaction protocol. Protocol identifier 120 may receive the transaction request and attribute and identify the transaction protocol according to the data of the transaction request and the attribute of the transaction request as described herein. Protocol identifier 120 may then transmit an identifier of the transaction protocol to computing device 102 on the user interface to illustrate to the user the transaction protocol that protocol identifier 120 identified as meeting the attribute the user selected.

Protocol identifier 120 can receive a selection of the identifier of the transaction protocol. Protocol identifier 120 can receive the selection of the transaction protocol from computing device 102 after the user provides an input selecting the displayed transaction protocol. In some cases, the user may select an option indicating the displayed transaction protocol is not correct. In such cases, protocol identifier 120 may receive the selection and repeat these operations identifying the transaction protocol that best satisfies the rules of the attribute selected by the user until receiving a selection to use an identified transaction protocol to complete the transaction. By doing so, network manager 104 may enable the user may integrate with the system to have fine control over the transaction protocol to use to complete a transaction.

In some embodiments, protocol identifier 120 may train a machine learning model (e.g., a neural network, a support vector machine, a random forest, etc.) based on the selection by the user. In doing so, protocol identifier 120 may train the machine learning model to automatically predict transaction protocols to suggest to users given values of transactions and selected attributes for such transactions (attributes indicating whether to identify the fastest transaction protocol or the transaction protocol that is lowest in cost). For example, upon receiving the transaction request, in addition to using the rule-based system to identify the transaction protocol to recommend at the user interface, protocol identifier 120 may generate a feature vector with the attribute and value included in the transaction request. In some cases, protocol identifier 120 may include other data about the transaction such as a time of the transaction (e.g., a timestamp in which the transaction request was sent or received or a user input timestamp indicating when to complete the transaction). Protocol identifier 120 may execute the machine learning model using the feature vector as input to cause the machine learning model to output a predicted transaction protocol for the transaction. Protocol identifier 120 may then use a selected transaction protocol (e.g., a user-selected transaction protocol) as a ground truth or label for the transaction request and use back-propagation techniques to refine weights or parameters of the machine learning model based on the prediction and selection. Protocol identifier 120 may iteratively train the machine learning model in this manner for any number of transaction requests to train the machine learning model to accurately predict transaction protocols to use to complete transactions. Upon sufficient training (e.g., training to an accuracy threshold), protocol identifier 120 may predict transaction protocols for transactions by executing the machine learning model.

Computer selector 122 may comprise programmable instructions that, upon execution, cause processor 114 to select a subset of computers. Computer selector 122 can select the subset of computers based on the selected transaction protocol. For example, identifications of different subsets of computers may be stored in memory with associations with identifications of different transaction protocols. Computer selector 122 may use the identification of the selected transaction protocol as an index in a query in memory to identify a subset of computers that correspond to the selected transaction protocol. Computer selector 122 can select the subset of computers that correspond to the transaction protocol the user selected to complete the transaction.

In some embodiments, computer selector 122 can select the subset of computers by selecting the pre-established connections of the subset of computers. For example, computer selector 122 may maintain a database that contains a list of the connections network manager 104 maintains with different subsets of computers. Computer selector 122 can identify the connections that correspond to the subset of the computers of the selected transaction protocol as the connections to use to transmit messages to complete the transaction.

Computer selector 122 can transmit messages to the computers of the subset. Computer selector 122 can transmit the messages over the connections computer selector 122 pre-established with the computers of the subset. In transmitting the messages, computer selector 122 can transmit the identifications of the sending account, the recipient account, and the value of the transaction in the messages to the subset of computers. The subset of the computers may receive such data and operate to transfer the value of the transaction from the sending account to the recipient according to the rules and systems the transaction protocol of the subset requires.

Figure 2:
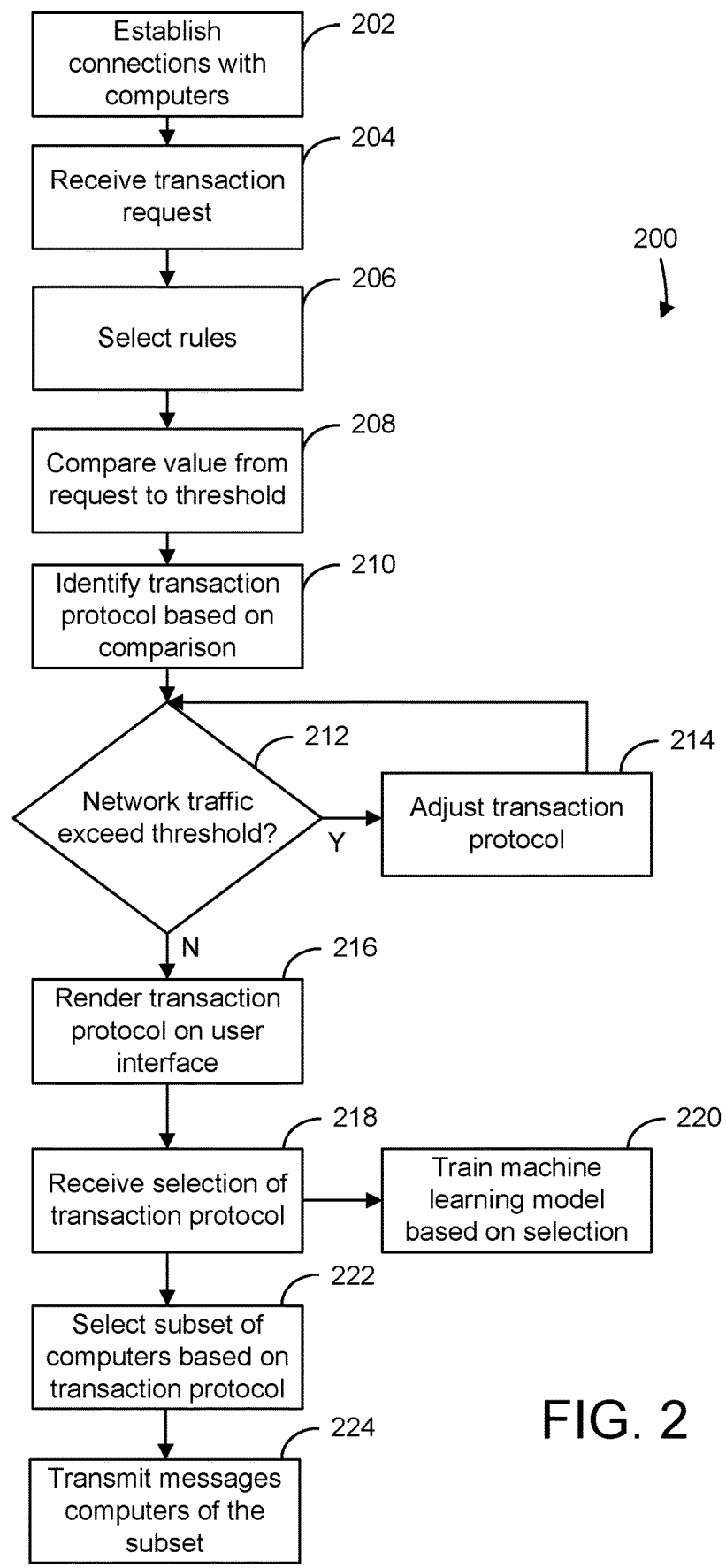
FIG. 2 is an illustration of an example method for reducing network traffic, in accordance with an implementation.

FIG. 2 is an illustration of an example method 200 for reducing network traffic, in accordance with an implementation. Method 200 can be performed by a data processing system (e.g., a client device or network manager 104, shown and described with reference to FIG. 1, a server system, etc.). Method 200 may include more or fewer operations and the operations may be performed in any order. Performance of method 200 may enable the data processing system to facilitate transactions between profiles or accounts without overburdening financial infrastructures with an excess number of messages to complete the transactions. The data processing system may do so by applying one or more rules corresponding to different network limitations to transaction attributes and/or data of different transaction requests. For example, for a transaction, the data processing system can identify a transaction protocol and a subset of computers that correspond to the transaction protocol to complete the transaction based on such a set of rules. The data processing system can transmit messages to the subset of computers to complete the transaction. The data processing system can transmit messages to different subsets of computers for transactions over time. In this way, the data processing system can avoid sending too many messages to any single subset of computers to overburden the subset of computers with network packets or messages for multiple transactions. As described herein, references to messages can be references to network packets and vice versa.

At operation 202, the data processing system establishes connections with computers. The data processing system can establish the connections with the computers over a network. To do so, the data processing system can communicate with the computers across the network. In one example, the data processing system can transmit syn packets to the computers and establish the connections using a TLS handshaking protocol. The data processing system can use any handshaking protocol to establish connections with the computers.

When establishing the connections with computers, the data processing system can establish connections with computers that correspond to (e.g., are associated with) different transaction protocols (e.g., that are a part of different financial infrastructures). For example, the data processing system can establish connections with computers that are a part of different subsets of computers that operate to complete or otherwise facilitate transactions using different transaction protocols. Each subset of computers that corresponds to a transaction protocol can include one or more computers that communicate with each other and/or process messages to facilitate transactions. Each subset of computers may operate differently depending on the transaction protocol such that one subset may require multiple verification checks to confirm a transaction, such as an ACH transaction, and another subset can operate to maintain a blockchain of records (e.g., blocks or block instances) for transactions. The subset of computers that maintain the blockchain may use the blockchain to facilitate transactions. Because each transaction protocol may follow a different process for completing transactions and may have its own set of rules (e.g., network rules), each transaction protocol may facilitate transactions at different speeds and/or may complete different volumes of transactions within the same time period.

The data processing system can establish connections with the different subsets of computers corresponding to different transaction protocols prior to receiving a transaction request. Doing so may enable the data processing system to select which subset of computers to transmit messages to complete a transaction upon receiving such a request in real-time. Because the data processing system may have already established the connections with each of the subsets of computers, the data processing system may communicate with computers of a particular subset of computers to perform a transaction that corresponds to a transaction request without taking time to establish connections with computers of the subset. Further, the data processing system can maintain the connections and transmit messages for multiple connections to the different subsets of computers over the same connections over time. By establishing the connections and reusing the same connections to facilitate transactions over time, the data processing system can avoid establishing connections for each request and thus reduce latency for any single transaction.

At operation 204, the data processing system receives a transaction request. The transaction request can include an identification of a sending account (e.g., a numeric or alphanumeric identifier), an identification of a recipient account (e.g., a numeric or alphanumeric identifier), and a value. In some cases, the transaction request may include an identification of a system of record (e.g., a computer) that hosts or stores the recipient account. The transaction request may be a request to subtract the value from the sending account and add the value to the recipient account in a transaction. The data processing system can receive the transaction request from a computing device over a network. The computing device may access a platform the data processing system provides over the network and transmit the transaction request in a network packet or message to the data processing system via the platform. For example, a user may access the user's account on the platform the data processing system provides via a computing device. The user may select options on the platform that causes the user's account with the platform to transmit a transaction request to the data processing system to subtract a value from the user's account as a sending account and to add the subtracted value to a recipient account.

In some embodiments, the transaction request can include attributes. The attributes may be inputs by a user indicating desired characteristics (e.g., a characteristic desired by the user) of the transactions for the transactions to be performed. For example, the attributes can be indications to identify a transaction protocol in which to complete a transaction based on a speed of the transaction, a cost (e.g., a processing cost) the transaction may incur, a type of the transaction (e.g., conventional or blockchain-based), etc. The data processing system can receive the attributes in the same or a different network packet as the transaction request that includes the identifications of the sending and recipient account and the value.

In one example, the data processing system can render a graphical user interface on the computing device that includes one or more selectable options that each indicate an attribute of a transaction request. A user may select one of the selectable options from the one or more selectable options and the computing device may include the selected option in the data packet that includes the transaction request. The data processing system may receive the data packet including the selectable options and identify the attribute of the transaction request as the selected option.

The data processing system can select rules. The data processing system can select the rules by selecting a set of rules based on the attribute or attributes that are included in the transaction request. For example, the data processing system can store a set of speed rules, a set of cost rules, and a set of network rules. The speed rules and cost rules can be rules that compare different transaction protocols together. For example, the speed rules may indicate a comparison of the fastest transaction protocols and the cost rules may indicate the costs that the different transaction protocols may incur in completing transactions. The network rules may be rules that are specific to each transaction protocol such as time windows in which the computers associated with each transaction protocol can receive messages to complete transactions or maximum or minimum values of transactions that the subsets of computers may process. The data processing system can select the set of rules to use to identify a transaction protocol from memory based on the attribute or attributes that are included in the transaction request.

Upon selecting the set of rules to use to identify a transaction protocol for a transaction, the data processing system can retrieve the set of rules from memory. The data processing system may do so by querying memory using an identification of the set of rules as an index. The data processing system can identify the set of rules that correspond to a matching value to the identification and retrieve the identified set of rules from memory.

The data processing system can store and select any number of types of rules. For example, the data processing system can store and select the set of speed rules, the set of cost rules, and the set of network rules in memory. The data processing system can select a set of network rules of a transaction protocol responsive to identifying the transaction protocol associated with the threshold that satisfies a speed rule or a cost rule, depending on the attribute included in the request. For example, if the attribute in the transaction request is an identification of a speed attribute (e.g., the request is to complete the transaction as fast as possible), the data processing system may identify the first transaction protocol as the fastest transaction protocol based on the set of speed rules the data processing system stored in memory. If the attribute in the transaction request is an identification of a cost attribute (e.g., the request is to complete the transaction while incurring the least amount of costs), the data processing system may identify the first transaction protocol as the lowest cost transaction protocol based on the set of cost rules the data processing system stored in memory. The data processing system may then identify the set of network rules associated with the transaction protocol.

In some cases, the data processing system can retrieve a set of network rules and the set of rules that corresponds to the attribute of the transaction request (e.g., select the set of network rules and the set of speed rules or the set of cost rules) from memory. For example, after identifying either the speed or the cost attribute, the data processing system may retrieve the identified set of rules from memory. The data processing system may apply the set of rules to determine which transaction protocol satisfies the set of rules (e.g., which transaction protocol is the fastest or which transaction protocol is the lowest cost). The data processing system may determine the transaction protocol that satisfies the set of rules and retrieve the network rules that correspond to the identified transaction protocol. The data processing system may then use the set of network rules to determine whether to use the transaction protocol to complete the transaction. In this way, the data processing system can identify a transaction protocol that complies with the attribute in the transaction request and that does not violate any network rules that are specific to the different transaction protocols.

At operation 208, the data processing system compares the value to a threshold. For example, the data processing system may compare the value to a threshold of a network rule for the transaction protocol (e.g., a first transaction protocol) the data processing system identified as satisfying the set of speed rules or set of cost rules. Responsive to determining the value is less than the threshold, the data processing system may identify the transaction protocol as a transaction protocol to use to complete the transaction of the transaction request.

However responsive to determining the value exceeds the threshold, the data processing system can compare the value to a threshold of another transaction protocol. For example, if the data processing system determines the value exceeds the threshold, the data processing system can apply the set of speed rules or the set of cost rules to identify the next fastest or next lowest cost transaction protocol. The data processing system can retrieve the set of network rules that corresponds to the identified transaction protocol and retrieve a threshold from the set of network rules. The data processing system can compare the value of the transaction to the retrieved threshold. Responsive to determining the value is less than the threshold, the data processing system can identify the transaction protocol that corresponds to the threshold at operation 210. Otherwise, the data processing system can repeat this process until identifying a transaction protocol that corresponds to a threshold that the value of the transaction request does not exceed.

In some embodiments, the data processing system may select the threshold after determining the subset of computers that correspond to the threshold are configured to receive transactions at a time of the transaction. For example, the different network rules may indicate time periods in which the subsets of computers for different transaction protocols can receive and/or process messages for transactions. The data processing system may identify a timestamp for the transaction of the transaction request (e.g., a timestamp in which the transaction request was sent or received or a user input timestamp indicating a time to complete the transaction). The data processing system may compare the time indicated by the timestamp to the time periods for the different transaction protocols and identify the transaction protocol responsive to the timestamp occurring outside of time periods in which other subsets of computers are configured to receive or process messages for transactions and/or responsive to the timestamp falling within a time period in which the subset of computers associated with the transaction protocol is configured to receive or process messages for transactions.

To identify the transaction protocol at operation 210, the data processing system can extract a string identifying the transaction protocol or label an identification of the transaction protocol to indicate the transaction protocol has been identified. In some cases, identifying the transaction protocol includes determining the transaction protocol is a potential transaction protocol to use to complete the transaction.

At operation 212, the data processing system may determine if the data processing system has transmitted messages to the subset of computers associated with the identified transaction protocol for a number of transactions exceeding a threshold. The data processing system can do so, for example, based on the number of network packets the data processing system has transmitted to the subset of computers or based on the number of transactions the subset of computers has completed. For instance, the data processing system may maintain a counter for each transaction protocol. The data processing system may increment the counter for a transaction protocol in each instance in which the data processing system transmits messages for a transaction to a subset of computers that corresponds to the transaction protocol. The data processing system can increment the counters over time to determine a total number of transactions for which the data processing system has transmitted messages to each subset of computers to complete transactions. Upon identifying a transaction protocol according to the set or sets of rules as described above, the data processing system may identify a count of the counter associated with the identified transaction protocol and compare the count to a threshold (e.g., a global threshold that applies to all transaction protocols or a threshold specific to the transaction protocol that the data processing retrieves from memory in response to identifying the transaction protocol). If the count of the counter exceeds the threshold, at operation 214, the data processing system can adjust or change the transaction protocol to use to complete the transaction.

In some cases, the data processing system may determine if the subset of computers associated with the identified transaction protocol have received an amount of network traffic exceeding a threshold within a time window (e.g., a defined time window). The time window may be a set time window (e.g., the data processing system may be configured to determine the number of transactions different subsets of computers perform at set intervals such as every hour, every day, every week, etc.) or a moving time window (e.g., the data processing system may be configured to determine the number of transactions different subsets of computers perform within a defined period of time previous (e.g., immediately previous) to the current time). The data processing system may maintain and increment counters for the different transaction protocols for the different set time windows as the data processing system completes transactions through the transaction protocols (e.g., transmits messages for transactions to the subsets of computers of the transaction protocols to complete transactions) and/or maintain, increment, and decrement counters for the transaction protocols as the data processing system completes transactions and the times of the completed transactions fall out of the moving time window. The data processing system may compare the counter for a time period including the current time or the moving time window to a threshold (e.g., a global threshold that applies to all transaction protocols or a threshold specific to the transaction protocol, as described above). If the count of the counter exceeds the threshold, at operation 214, the data processing system can adjust or change the transaction protocol to use to complete the transaction.

In one example, the data processing system can identify a timestamp of the transaction request (e.g., a timestamp in which the transaction request was sent or received or a user input timestamp indicating a time to complete the transaction). The data processing system can identify a number of network packets the data processing system transmitted across the one or more connections between the processor and the subset of computers within a defined time period comprising a time of the timestamp (e.g., a count of a counter of the time window of the transaction or a multiple of the count that corresponds to the transaction protocol (e.g., the multiple may be the number of messages the data processing system may transmit the subset of computers to complete the transaction and may vary depending on the transaction protocol)). The data processing system can compare the number of network packets to a threshold (e.g., a global threshold that applies to all transaction protocols or a threshold specific to the transaction protocol, as described above). If the number of network packets exceeds the threshold, at operation 214, the data processing system can adjust or change the transaction protocol to use to complete the transaction.

In some embodiments, the data processing system may determine whether the subset of computers is receiving too high of a percentage of messages to complete transactions compared to subsets of computers of other transaction protocols. For example, the data processing system may calculate a percentage of transactions for which the data processing system has transmitted messages to the subset of computers as compared to the subset of computers of other transaction protocols. The data processing system may do so by comparing the counts of the counters the data processing system maintains as described above to a threshold. If the percentage exceeds the threshold (e.g., a global threshold that applies to all transaction protocols or a threshold specific to the transaction protocol, as described above), at operation 214, the data processing system can adjust or change the transaction protocol to use to complete the transaction. Accordingly, the data processing system may evenly distribute the computers to which to transmit network packets and not overload any single subset of computers with network packets or transactions to process.

In some embodiments, in addition to or instead of determining if the number of transactions the subset of computers associated with the identified transaction protocol have performed exceed a threshold, the data processing system can determine if a rate of the number of transactions the subset of computers have performed exceeds a threshold (e.g., a rate threshold). For example, the data processing system may store timestamps indicating the times the data processing systems completed transactions using different transaction protocols. The timestamps may indicate the times in which the data processing system received transaction requests, the times in which computing devices transmitted transaction requests, the times in which the data processing system transmitted messages to subsets of computers to complete the transactions, and/or times in which the data processing system receives notifications that the transactions have been completed. The data processing system may calculate a rate in which the subset of computers has completed transactions by identifying the number of timestamps the data processing system has stored for a time frame in which the end of the time frame is the current time and dividing the number by the length of the time frame. The data processing system can compare the rate to a threshold (e.g., a global threshold that applies to all transaction protocols or a threshold specific to the transaction protocol, as described above). If the rate exceeds the threshold, at operation 214, the data processing system can adjust or change the transaction protocol to use to complete the transaction.

In some embodiments, instead of or in addition to determining whether the data processing system has transmitted too many transactions or transmitted transactions at too high of a rate, the data processing system may determine if the subsets of computers have received too many transactions or received transactions at too high of a rate. For example, the subset of computers may receive messages for transactions from multiple computer systems that are owned by separate entities and that each operate within their own local networks. The subset of computers may maintain counters and determine the rates in which the subset of computers receive such messages from each of the computer systems. The subset of computers may do so in a similar manner to how the data processing system can maintain counters for the transactions for which the data processing system transmits messages. The data processing system can transmit a request to the subset of computers for the rates or total number of transactions the subset of computers performed and receive the requested data from the subset of computers. The data processing system can compare the rates or the total number of transactions to a threshold (e.g., a global threshold that applies to all transaction protocols or a threshold specific to the transaction protocol, as described above). If the rate exceeds the threshold, at operation 214, the data processing system can adjust or change the transaction protocol to use to complete the transaction.

The data processing system may iteratively apply the rules or processes described with reference to operation 214 and filter out subsets of computers as options to complete a transaction if the subset does not complete any one rule. For example, the data processing system may determine whether to select or identify the transaction protocol associated with the subset of computers by first determining whether the percentage of total messages the data processing system has transmitted to the subset of computers exceeds a threshold. Responsive to determining the percentage exceeds the threshold, the data processing system may adjust the transaction protocol to use to complete the transaction at operation 214. However, responsive to determining the percentage does not exceed the threshold, the data processing system may determine if the total number of messages the data processing system has transmitted to the subset of computers or the total number of messages the subset of computers has received exceeds a threshold to determine whether to adjust the transaction protocol. The data processing system may apply any such rules in any order to filter out subsets of computers. In doing so, the data processing system may avoid using processing resources to calculate and compare the different iterations of rules for each subset and instead stop applying rules to the identified subset if the subset does not satisfy one or more rule or threshold, thus conserving processing resources.

In some embodiments, the data processing system may query the subsets of computers for an indication of whether the subset can process another transaction. If the subset of computers transmit an indication that no transaction can be performed (e.g., because the subset of computers has recently processed too many transactions or is processing transactions at too high of a rate (e.g., a rate above a threshold)), at operation 214, the data processing system can adjust or change the transaction protocol to use to complete the transaction. Accordingly, the data processing system may determine if the subset of computers of the identified transaction is currently processing transactions at too high of a rate to process another transaction and avoid transmitting messages for the transaction of the transaction request to the subset of computers.

In some embodiments, prior to determining if the data processing system has transmitted too many messages for too many transactions or the subset of computers has received too many messages for too many transactions, the data processing system may determine if the subset of computers is in communication with the system of record that stores the recipient account. For example, the data processing system may maintain (e.g., store) lists of systems of record (or their owners) with which the different subsets of computers are in communication. The data processing system may identify the system of record or the owner of the system of record that stores the recipient account. The data processing system may compare an identifier of the system of record or owner of the system of record to the list and identify the subsets of computers that are in communication with the system of record storing the recipient account. The data processing system can remove (e.g., filter out) any subsets of computers (e.g., transaction protocols) as possibilities to complete the transaction because the subsets of computers do not have connections with the system of record and could not complete the transaction.

The data processing system can adjust or change the transaction protocol at operation 214 by selecting a new transaction protocol to use to complete the transaction. For example, if the data processing system determines at operation 212 that the subset of computers does not have the processing capacity (e.g., memory resources) to complete the transaction for the transaction request, the data processing system may identify a new transaction protocol by performing operations 206-210 but excluding the initially identified transaction protocol as an option. The data processing system may then perform operation 212 with the newly identified transaction to determine whether the subset of computers associated with the new transaction protocol have the processing capacity to handle the transaction of the transaction request. The data processing system may repeat operations 206-214 until the data processing system identifies a transaction protocol that corresponds to a subset of computers that has the processing capacity to complete the transaction.

At operation 216, the data processing system can render an identifier of the transaction protocol on a user interface. For example, the data processing system can generate a user interface including the identifier of the transaction protocol. The data processing system can transmit the user interface to the computing device that transmitted the transaction request to the data processing system. The computing device may receive and display the user interface on a display to the user accessing the computing device. In this way, the data processing system may indicate to the user the transaction protocol the data processing system determined fits the attribute the user selected to be included with the transaction request.

For example, when generating the transaction request at the user interface, the user may select an option for the data processing system to complete a transaction using the fastest transaction protocol. The data processing system may receive the transaction request and attribute and identify the transaction protocol according to the data of the transaction request and the attribute of the transaction request as described with respect to operations 204-214. The data processing system may then transmit an identifier of the transaction protocol to the computing device on the user interface to illustrate to the user the transaction protocol the data processing system identified as meeting the attribute the user selected.

At operation 218, the data processing system can receive a selection of the identifier of the transaction protocol. The data processing system can receive the selection of the transaction protocol from the computing device after the user provides an input selecting the displayed transaction protocol. In some cases, the user may select an option indicating the displayed transaction protocol is not correct. In such cases, the data processing system may receive the selection and perform operations 206-216 identifying the transaction protocol that best satisfies the rules of the attribute selected by the user until receiving a selection to use an identified transaction protocol to complete the transaction. By doing so, the data processing system may enable the user may integrate with the system to have fine control over the transaction protocol to use to complete a transaction.

In some embodiments, at operation 220, the data processing system may train a machine learning model (e.g., a neural network, a support vector machine, a random forest, etc.) based on the selection by the user. In doing so, the data processing system may train the machine learning model to automatically predict transaction protocols to suggest to users given values of transactions and selected attributes for such transactions (attributes indicating whether to identify the fastest transaction protocol or the transaction protocol that is lowest in cost). For example, upon receiving the transaction request, in addition to using the rule-based system to identify the transaction protocol to recommend at the user interface, the data processing system may generate a feature vector with the attribute and value included in the transaction request. In some cases, the data processing system may include other data about the transaction such as a time of the transaction (e.g., a timestamp in which the transaction request was sent or received or a user input timestamp indicating when to complete the transaction). The data processing system may execute the machine learning model using the feature vector as input to cause the machine learning model to output a predicted transaction protocol for the transaction. The data processing system may then use a selected transaction protocol (e.g., a user-selected transaction protocol) as a ground truth or label for the transaction request and use back-propagation techniques to refine weights or parameters of the machine learning model based on the prediction and selection. The data processing system may iteratively train the machine learning model in this manner for any number of transaction requests to train the machine learning model to accurately predict transaction protocols to use to complete transactions. Upon sufficient training (e.g., training to an accuracy threshold), the data processing system may predict transaction protocols for transactions by executing the machine learning model.

At operation 222, the data processing system can select a subset of computers. The data processing system can select the subset of computers based on the selected transaction protocol. For example, identifications of different subsets of computers may be stored in memory, each with associations with identifications of different transaction protocols. The data processing system may use the identification of the selected transaction protocol as an index in a query in memory to identify a subset of computers that correspond to the selected transaction protocol. The data processing system can select the subset of computers that correspond to the transaction protocol the user selected to complete the transaction.

In some embodiments, the data processing system can select the subset of computers by selecting the pre-established connections of the subset of computers. For example, the data processing system may maintain a database that contains a list of the connections the data processing system maintains with different subsets of computers. The data processing system can identify the connections that correspond to the subset of the computers of the selected transaction protocol as the connections to use to transmit messages to complete the transaction.

At operation 224, the data processing system can transmit messages to the computers of the subset. The data processing system can transmit the messages over the connections the data processing system pre-established with the computers of the subset. In transmitting the messages, the data processing system can transmit the identifications of the sending account, the recipient account, and the value of the transaction in the messages to the subset of computers. The subset of the computers may receive such data and operate to transfer the value of the transaction from the sending account to the recipient according to the rules and systems the transaction protocol of the subset requires.

The data processing system can facilitate transactions in the above-described manner for any number of transactions. In doing so, the data processing system may complete transactions using multiple transaction protocols and accordingly send messages to multiple subsets of computers to complete such transactions. Thus, method 200 involves distributing messages to multiple subsets of computers to complete transactions using rules that take into account the number of transactions for which the data processing system has transmitted messages to different subsets of computers or the total number of transactions the different subsets of computers have completed. Thus, by performing method 200, the data can reduce network traffic and computational resources of the individual computers completing the transactions.

In some cases, the data processing system can receive a transaction request with an attribute that indicates to select all of the transaction protocols that are available to complete the transaction of the transaction request. In these cases, the data processing system can apply the set of network rules the data processing system has stored in memory for each transaction protocol without applying a set of speed rules or a set of cost rules. The data processing system can apply the network rules to transaction data (e.g., the value of the transaction and the timestamp of the transaction) to filter out any transaction protocols that are not configured to process transactions of the value or during the time of the timestamp. The data processing system may also identify an identification of the system of record of the recipient account and determine if the system of record is in communication with the subsets of computers of the different transaction protocols. The data processing system may remove, from a list of potential transaction protocols, any transaction protocols for which the transaction does not satisfy the set of network rules for the respective protocols or that the system of record of the recipient account does not have a connection with the subset of computers associated with the respective transaction protocol. The data processing system may then determine and remove further transaction protocols from the list that do not have the processing capacity or network resources to complete the transaction. The data processing system may transmit a list of remaining transaction protocols to the computing device that sent the request for display on a user interface. In some cases, a user may view the list of remaining transaction protocols and select a transaction protocol from the list. The data processing system may receive the selection from the computing device and transmit messages to the subset of computers associated with the selected transaction protocol with the data for the transaction to complete the transaction.

Profile updater 124 may comprise programmable instructions that, upon execution, cause processor 114 to update the profile of the sending account and/or the recipient account in profile database 128. Profile updater 124 may update the account or accounts responsive to receiving an indication from the selected subset of computers that completed the transaction that the transaction is complete. To do so, profile updater 124 may subtract the value of the transaction out of the sending account. In cases in which the data processing system stores the recipient account (e.g., both accounts are registered and stored on the same platform provided by the data processing system), profile updater 124 may add the value of the transaction to the recipient's account. In this way, profile updater 124 may maintain a record of the transactions that are facilitated by network manager 104.

Figure 3:
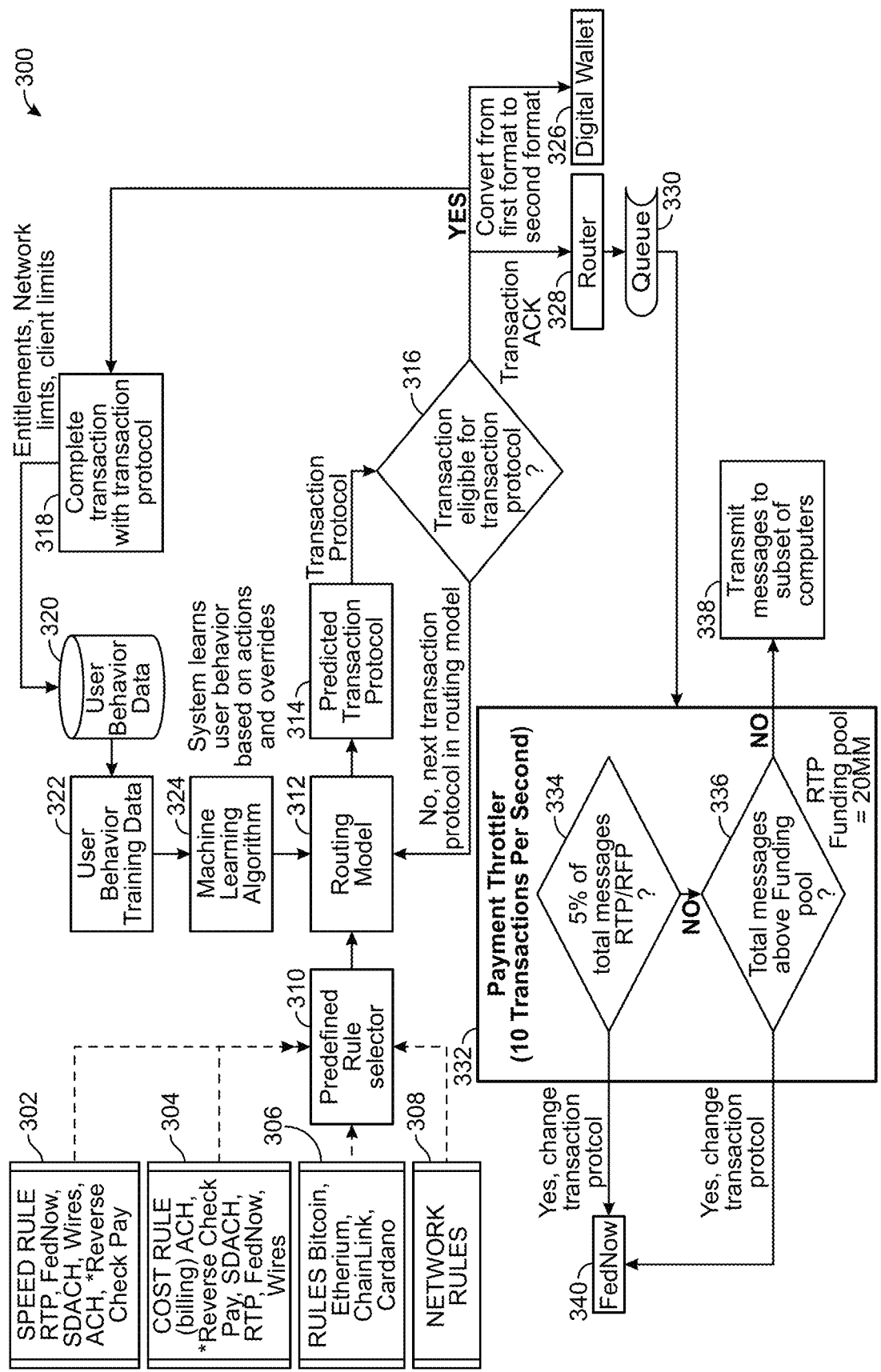
FIG. 3 is an illustration of another example method for reducing network traffic, in accordance with an implementation.

FIG. 3 is an illustration of an example sequence 300 for reducing network traffic, in accordance with an implementation. Sequence 300 can be performed by a data processing system (e.g., a client device or network manager 104, shown and described with reference to FIG. 1, a server system, etc.). Sequence 300 may include more or fewer operations and the operations may be performed in any order. In sequence 300, the data processing system can receive a transaction request to transmit a value from a sending account to a recipient account. The transaction request can also include an attribute for the transaction request. The data processing system can receive the request including the attribute and identify whether to use a set of speed rules 302, a set of cost rules 304, a set of blockchain rules 306, or a set of network rules 308 to determine which transaction protocol to use to complete the transaction of the transaction request.

The data processing system can identify which rules to select at an operation 310. The data processing system may do so by identifying the set of speed rules 302, the set of cost rules 304, or the set of blockchain rules 306 based on the attribute indicated in the transaction request. For example, the data processing system may identify the set of speed rules 302 if the attribute indicates to identify the transaction protocol that would complete the transaction of the transaction request the fastest. The data processing system may identify the set of cost rules 304 if the attribute indicates to identify the transaction protocol that could complete the transaction while incurring the lowest cost. The data processing system may identify the set of blockchain rules 306 if the attribute indicates to identify a type of blockchain to use to complete the transaction. The data processing system may retrieve each of the set of network rules 308.

At operation 312, the data processing system can identify a transaction protocol to use based on the identified set of rules (e.g., the identified set of speed rules 302, set of cost rules 304, or set of blockchain rules 306 and the network rules 308). The data processing system can identify the transaction protocol that is the fastest or has the lowest cost depending on the attribute included with the request and that has a set of network rules with which the transaction request complies (e.g., the value of the transaction does not exceed a threshold of the transaction protocol and/or a timestamp of the transaction is within or at least not outside any time periods in which the computers of the transaction protocol are configured to receive messages or process transactions). The data processing system can apply such rules to the data of the transaction request to determine, at operation 314, a predicted transaction protocol to use to complete the transaction of the transaction request.

At operation 316, the data processing system can determine if the predicted transaction protocol can be used to complete the transaction. The data processing system can do so, for example, by determining if a subset of computers that correspond to the transaction protocol are in communication with the system of record of the recipient device and/or if the subset of computers has the processing capacity or network bandwidth to receive and process messages for the transaction. If the data processing system determines the subset of computers does not satisfy such criteria, the data processing system may repeat operations 312-314 and select a new transaction protocol that satisfies the sets of rules 302-308. The data processing system may repeat operations 312-316 until the data processing system identifies a transaction protocol that satisfies the sets of rules 302-308 and that has the processing resources and connections to complete the transaction. In some embodiments, the data processing system may make the determinations in operation 316 prior to or before performing operation 312.

In some embodiments, the data processing system can transmit an identifier of a transaction protocol to a computing device that transmitted the original transaction request. The computing device may display the transaction protocol on a user interface. A user accessing the computing device may select an option indicating whether the transaction protocol is correct or an option indicating the transaction protocol is incorrect. The computing device may transmit the selected option back to the data processing system. If the selected option indicates the transaction protocol is incorrect, the data processing system may repeat operations 312-316 and select a new transaction protocol that satisfies the sets of rules 302-308. The data processing system may repeat operations 312-316 until the data processing system identifies a transaction protocol for which a user selects an option indicating the protocol is correct and that satisfies criteria, as described above.

At operation 318, the data processing system can transmit messages to the subset of computers associated with the transaction protocol. The data processing system can do so by transmitting the messages to the devices containing the data for the transaction (e.g., identifications of the sending and/or recipient account, a value for the transaction, an identifier (e.g., a network address) of the system of record storing the recipient account, etc.). The data processing system can send the messages to one or more computers of the subset such that the computers can process the data and, in some cases depending on the transaction protocol, communicate with each other to complete the transaction.

At operation 320, the data processing system can store the data that was generated when the data processing system identified the transaction protocol and selected the subset of computers that as used to complete the transaction. In doing so, the data processing system can store the data of the transaction (e.g., the value, identifications of the recipient account and the sending account, the selected attribute, etc.) in memory (e.g., in a database). In some embodiments, the data processing system can also store indications of the transaction protocols that were presented to the user and the user's selections in memory. The data processing system may similarly store data for any number of transactions.

At operation 322, the data processing system can generate a feature vector of training data. The feature vector may be the data the data processing system stored from the transaction. The data processing system can generate the feature vector by placing the training data at specific index values of the feature vector. The data processing system may also label the feature vector with an indication (e.g., a user input indication) of the correct transaction protocol for the transaction.

At operation 324, the data processing system trains a machine learning model using the feature vector of training data. The data processing system may input the feature vector into the machine learning model and execute the machine learning model. The data processing system may then use back-propagation techniques with the label for the feature vector to train the machine learning model.

In some embodiments, responsive to the selected transaction protocol being a blockchain protocol, the data processing system may convert the value from a first format into a second format. The first format may be a format that is compatible with conventional transaction formats. The second format may be a format that is compatible with the blockchain format. The data processing system may then complete the transaction at operation 326 by transmitting messages for the transaction to the subset of computers that maintain the blockchain.

In some embodiments, instead of transmitting messages to the subset of computers associated with the selected transaction protocol, the data processing system executes another set of rules to determine whether to use the transaction protocol or adjust the transaction protocol. The data processing system may do so, for instance, responsive to identifying the transaction protocol of the subset of computers and determining there is a set of throttling rules for the transaction protocol (e.g., rules limiting the amount of messages or transactions the subset of computers of the transaction protocol can receive or process) in memory. At operation 328, the data processing system can route messages for the transaction into a queue 330 of the transaction protocol. At operation 332, the data processing system can execute a network throttler. The network throttle may be executable instructions that the data processing system may execute to determine if the computing devices associated with the transaction have received messages for too many transactions. At operation 334, the data processing system can determine whether the computers of the transaction protocol have received above a threshold percentage of the messages or transactions that the data processing system has transmitted or completed through the subset of computers. At operation 336, the data processing system can determine if the data processing system has sent a total number of messages for transactions to the subset of computers above a threshold. If the data processing determines neither the percentage of messages or transactions nor the total number of messages or transactions the data processing system has transmitted to the subset of computers exceeds their respective threshold, at operation 338, the data processing system can transmit messages for the transaction to the subset of computers to complete the transaction. Otherwise, if either the percentage or the total number exceeds its respective threshold, at operation 340, the data processing system may select a new predetermined transaction (e.g., the transaction protocol to use) to complete the transaction. In this way, the data processing system may limit the number messages the data processing system transmits to any single subset of computers.

Figure 4:
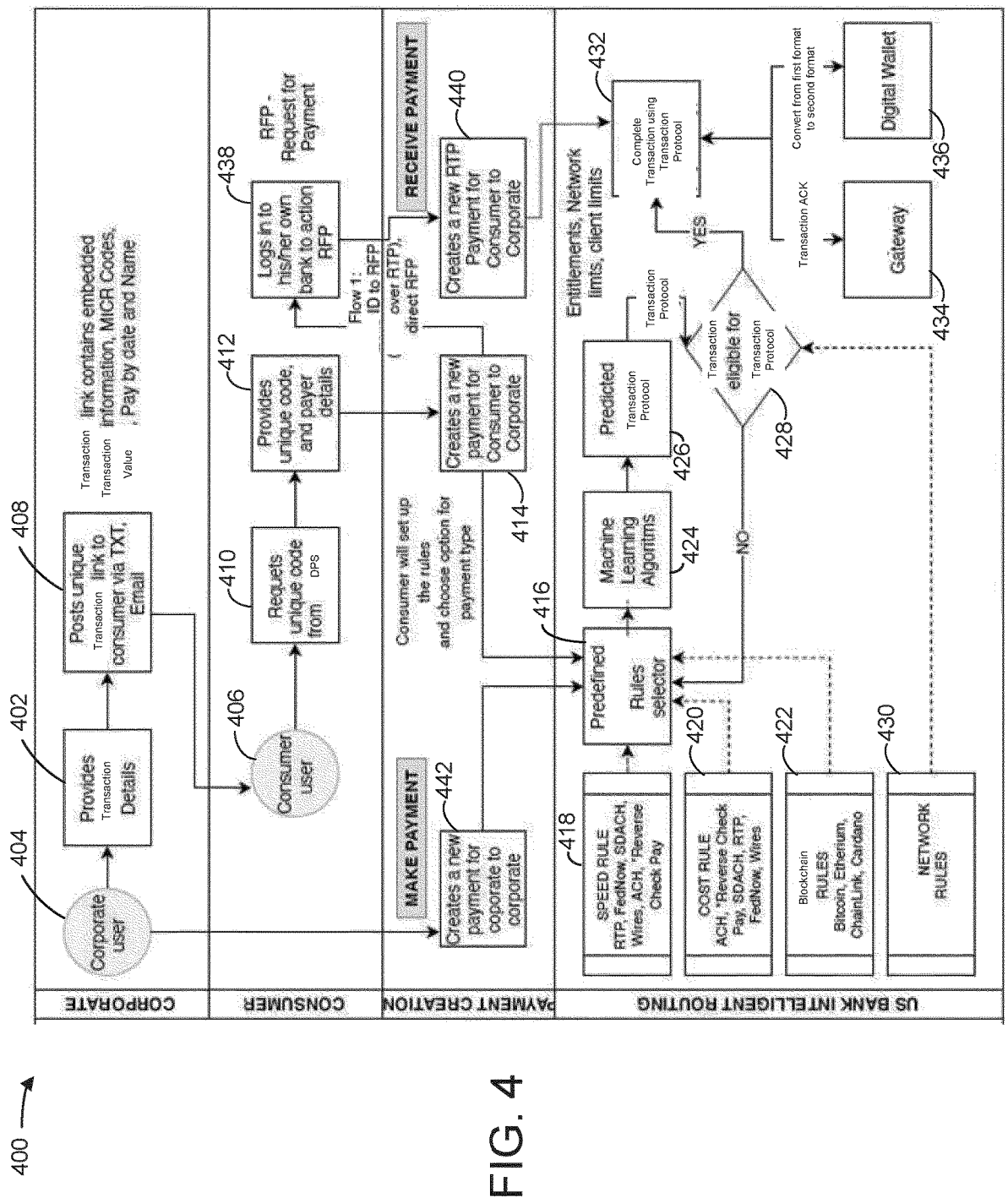
FIG. 4 is an illustration of another example method for reducing network traffic, in accordance with an implementation.

FIG. 4 is an illustration of another example method 400 for reducing network traffic, in accordance with an implementation. Method 400 can be performed by the components shown and described with reference to system 100. Method 400 may include more or fewer operations and the operations may be performed in any order and by any entity. In method 400, two entities (e.g., two individuals, an individual and an organization, or two organizations) may agree to perform a transaction subtracting a value from one entity's account and aggregating the value into the other entity's account. A data processing system (e.g., a client device or network manager 104, shown and described with reference to FIG. 1, a server system, etc.) may perform the systems and methods described herein to identify a transaction protocol and select a corresponding subset of computers to complete the transaction.

At operation 402, an organization entity 404 can generate, via a computing device accessing a platform provided by the data processing system, transaction details for a transaction. The transaction details may be a value for the transaction to be subtracted from one account and added into another account, an identifier of the of the organization entity 404 account as the sending account, and an identifier of another account owned by an individual entity 406 (e.g., an individual account). At operation 408, the organization entity 404 can transmit a notification or cause the data processing system to transmit a notification to the account of individual entity 406 or a computing device associated (e.g., being accessed by) the individual entity 406. The notification may be sent as a link, a text message, an email, etc. The notification may include the data for the transaction, a date by which the transaction needs to be complete, MICR codes, and the names of organization entity 404 and individual entity.

At operation 410, individual entity 406 may access the platform provided by the data processing system via a computing device. In doing so, individual entity 406 may request a unique code from the data processing system. The unique code may be a one-time code or password for the transaction proposed by the organization entity 404 or the individual entity's 406 account on the platform. The data processing system may generate the unique code (e.g., using a random number generator) and transmit the unique code to the computing device of the individual entity 406. At operation 412, individual entity 406 may input the unique code, authentication information, and/or details for the transaction (e.g., the value for the transaction, information of the account of organization entity 404, and/or information for the system of record that stores the account of organization entity 404) into the computing device being accessed by the individual entity 406. The computing device may transmit the input information to the data processing system.

At operation 414, the data processing system can generate an instance of the transaction between organization entity 404 and individual entity 406. The instance may be a record (e.g., a file, document, table, listing, message, notification, etc.) in memory that contains the information the computing devices accessed by organization entity 404 and individual entity 406 created and/or transmitted for the transaction. At operation 416, the data processing system may select a set of predefined rules (e.g., speed rules 418, cost rules 420, blockchain rules 422, etc.). The data processing system may select the set of rules based on an attribute that is included in the transaction request for the transaction. At operation 424, the data processing system may execute the selected set of rules and/or machine learning algorithms or models to determine a predicted transaction protocol 426 that satisfies the attribute, value, and/or timestamp of the transaction request.

At operation 428, the data processing system may determine if the predicted transaction protocol is eligible for the transaction. The data processing system may do so by executing network rules 430 and determining if the subset of computers associated with the transaction protocol has the processing resources and/or bandwidth to process another transaction. If the data processing system determines the transaction protocol is not eligible to complete the transaction, the data processing system may repeat operations 416-428 until identifying a transaction protocol that is eligible to complete the transaction. Upon identifying the eligible transaction protocol, at operation 432, the data processing system may complete the transaction by transmitting messages to the subset of computers that facilitate transactions under the transaction protocol. The data processing system may receive an indication that the transaction was completed from the subset of computers of the transaction protocol. At operation 434, the data processing system may update the sender and/or recipient account (e.g., update a local database or transmit messages to a computer storing the accounts to cause the accounts to be updated) based on the transaction being completed responsive to the transaction being completed using conventional methods. At operation 436, responsive to the attribute indicating to select a blockchain transaction protocol, the data processing system may update a digital wallet associated with the blockchain transaction protocol after converting the value of the transaction from a first value to a second value associated with the selected blockchain transaction protocol.

In some embodiments, in the case of an invoice, the sending account may select a transaction protocol to use to complete the transaction of the invoice. For example, after the data processing system generates an instance of the transaction between organization entity 404 and individual entity 406 at operation 414, the individual entity 406 can access the account of the individual entity 406 at operation 438. At operation 440, the individual entity 406 can select a transaction protocol (e.g., select a transaction protocol from a list of transaction protocols the data processing system renders on a user interface, such as a list the data processing system determines are eligible for the transaction based on the data (e.g., value, timestamp, systems of record, etc.) of the transaction). The data processing system can receive the selected transaction protocol and perform operations 432-436 to complete the transaction according to the selected transaction protocol.

In some embodiments, the data processing system can perform the systems and methods described herein for a transaction between two organization entities. For example, at operation 442, the data processing system can generate an instance of a transaction between the organization entity 404 and another organization entity. The data processing system may then perform operations 416-436 to complete the transaction between the organization entities.

FIG. 5A is an illustration of a user interface 500 for selecting an attribute of a transaction, in accordance with an implementation. A data processing system (e.g., a client device or network manager 104, shown and described with reference to FIG. 1, a server system, etc.) may generate and transmit user interface 500 to a computing device being accessed by a user. User interface 500 may enable the user to input a value 502, select or input a sending account 504 and a receiving account 506, and select or input attributes 508 (e.g., take me to the fastest option; take me to the cheapest option; if possible, show me all the options). The user may input or select values for each of these items and select a continue button 520 to transmit a transaction request to the data processing system comprising each of the selected or input items. The data processing system may receive the transaction request including the input or selected data, identify a transaction protocol using the systems and methods described herein, and generate a user interface 512, as illustrated in FIG. 5B, that includes an identifier of the identified transaction protocol. The user can select a continue button 516 to transmit a signal to the data processing system to cause the data processing system to transmit messages to a subset of the computer of the identified transaction protocol to complete the transaction.

FIG. 6 is an illustration of a user interface 600 for displaying a record of a transaction, in accordance with an implementation. The record of the transaction may be an invoice indicating an amount an entity (e.g., an individual) owes. A user may generate the record of user interface 600 and select a create invoice button 602 to transmit the invoice to the data processing system. The data processing system may receive the invoice and transmit the invoice to a computing device or account associated with the invoice. A user associated with the computing device or account (e.g., accessing or owning the computing device or account) can view the invoice and select an option to pay the invoice via the user interface 500, shown and described with reference to FIG.

Figure 7:
FIG. 7 is an illustration of a user interface for displaying a history of transactions, in accordance with an implementation.

FIG. 7 is an illustration of a user interface 700 for displaying a history of transactions, in accordance with an implementation. The history of transactions may be a history of transactions performed by an account of a platform generated or provided by a data processing system (e.g., a client device or network manager 104, shown and described with reference to FIG. 1, a server system, etc.). The history may indicate the status of different invoices or payments and the payment types that were used to pay the different invoices. In instances in which the invoices were not paid, the history may include an option to access user interface 500, shown and described with reference to FIG. 5A, to pay the invoice.

Figure 8:
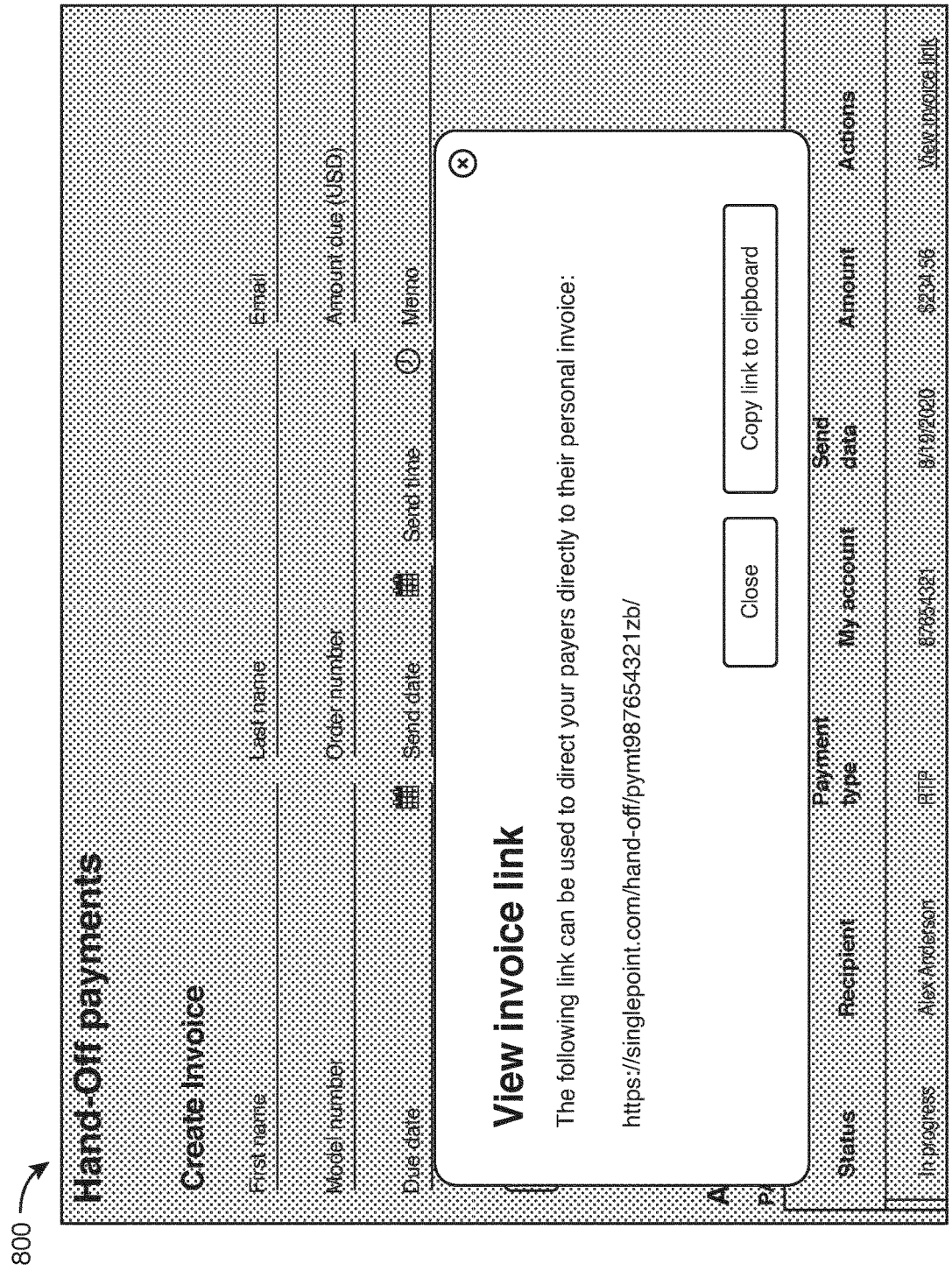
FIG. 8 is an illustration of a user interface comprising a pointer for a transaction, in accordance with an implementation.
Figure 9A:
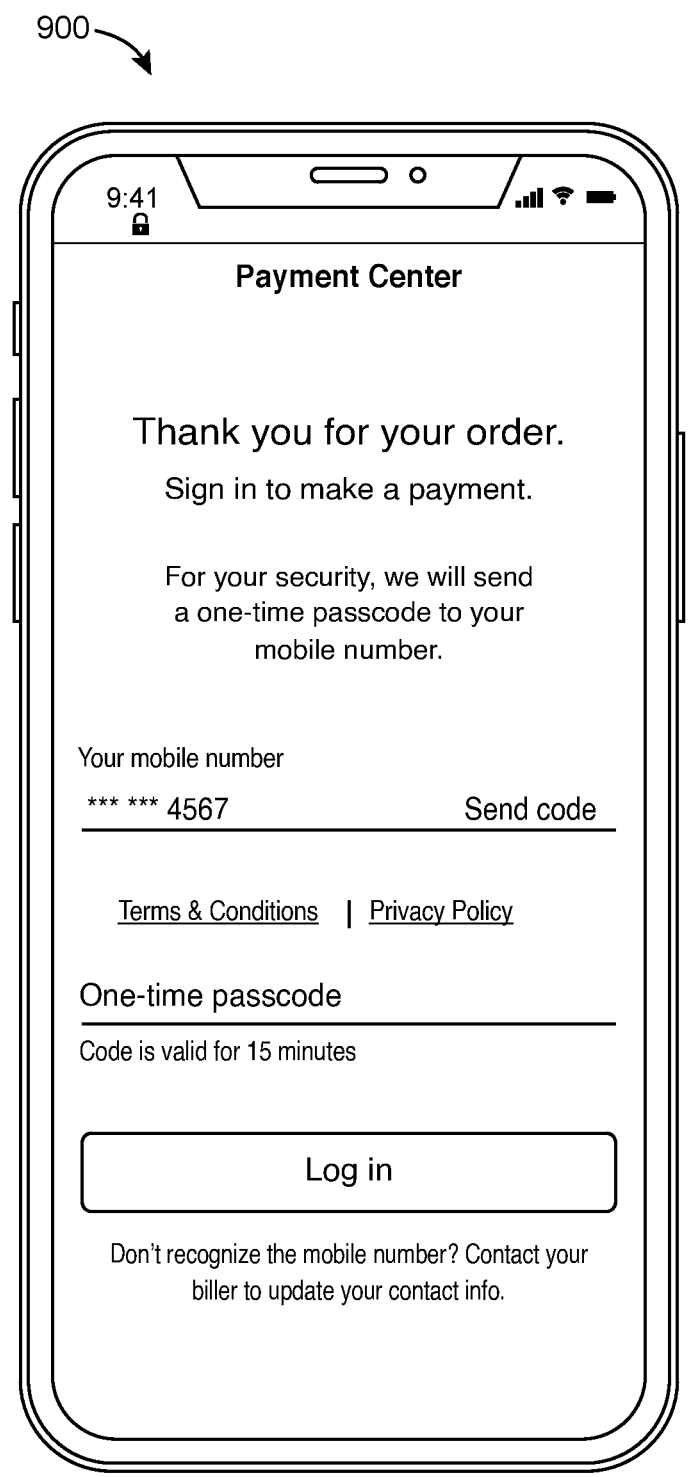
FIGS. 9A-9D are illustrations of user interfaces for completing transactions, in accordance with an implementation.
Figure 9B:
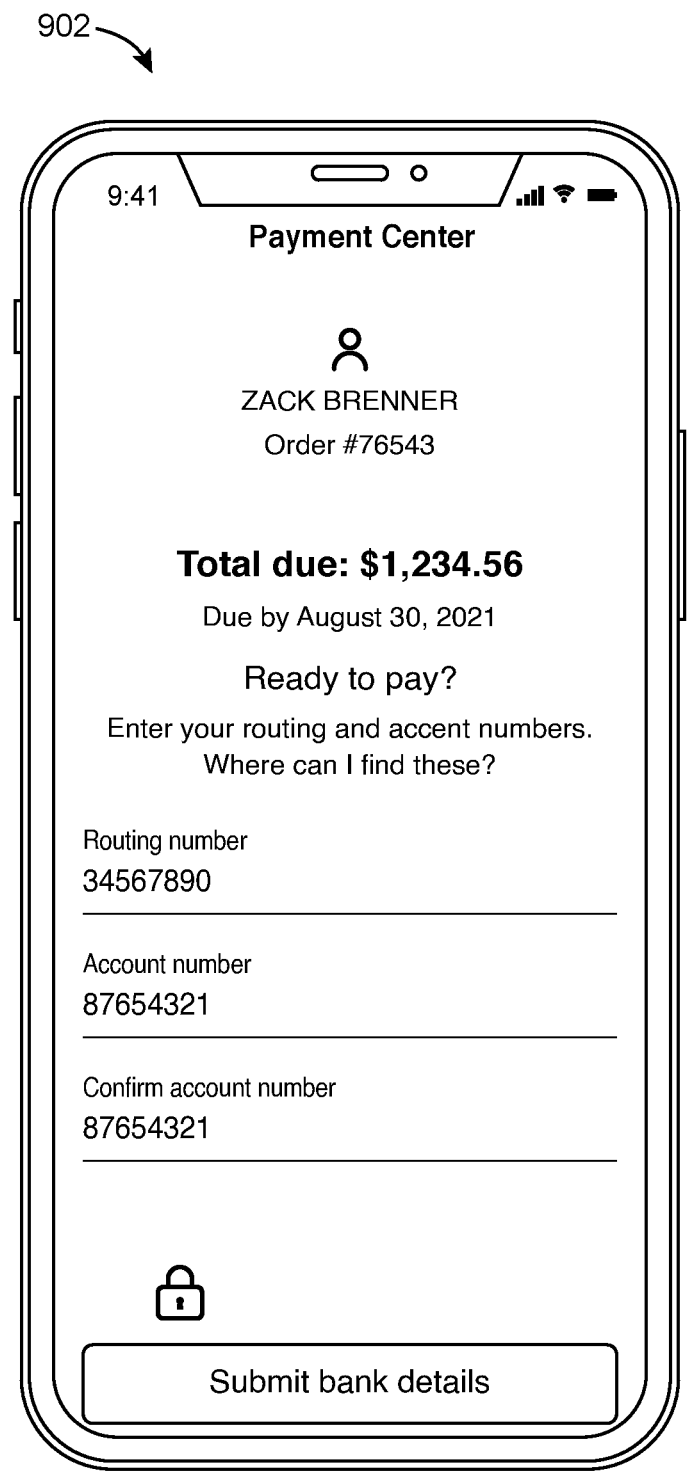
Figure 9C:
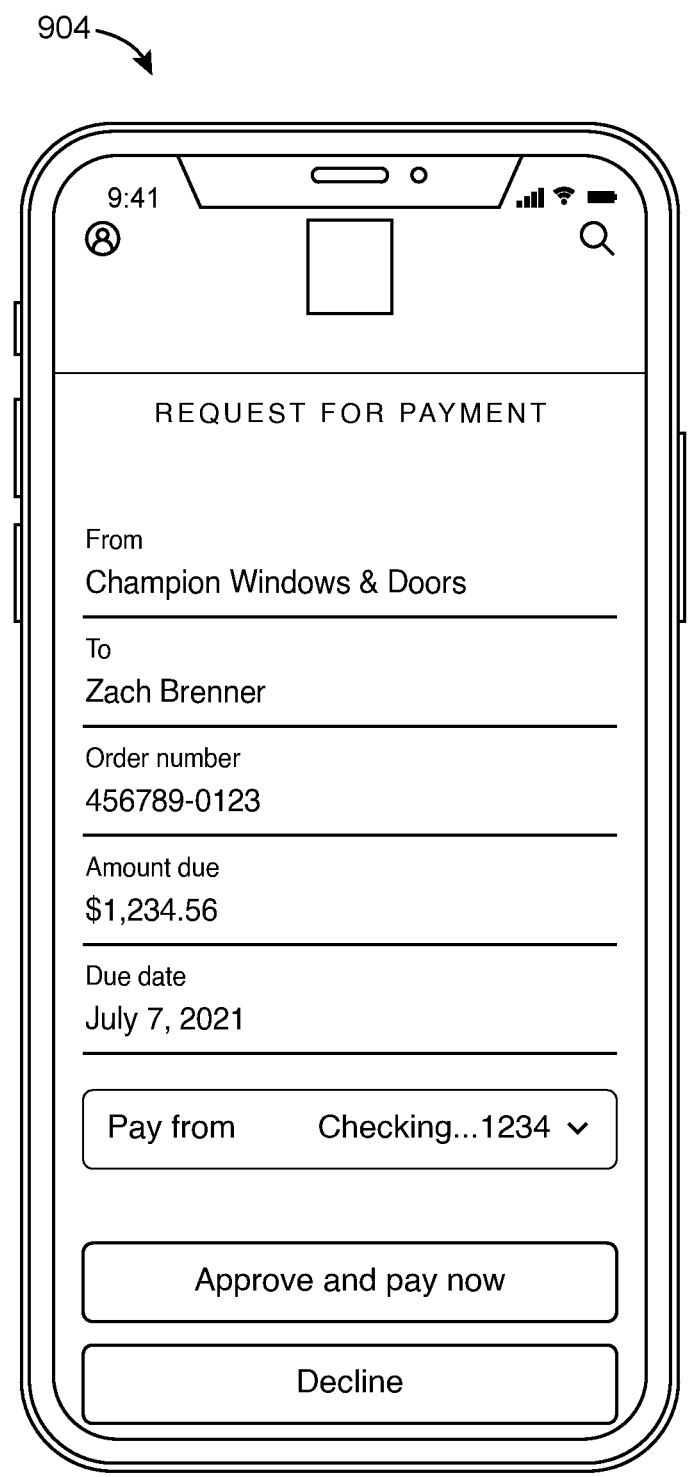
Figure 9D:
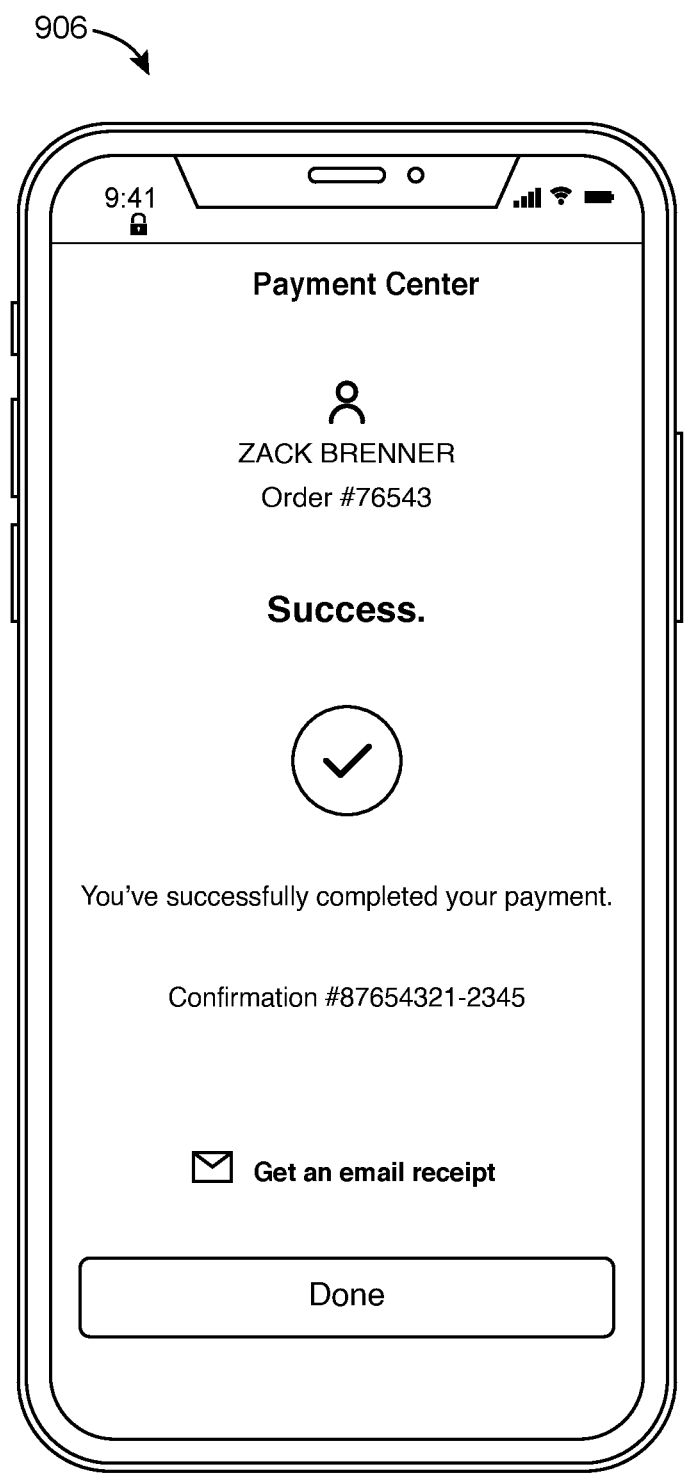

FIG. 8 is an illustration of a user interface 800 comprising a pointer for a transaction, in accordance with an implementation. User interface 800 may include a URL (uniform resource locator) link that a user may copy and paste to access an invoice for payment using the systems and methods described herein. A user may manually copy and paste the link or select a button that automatically copies the link to a cache in memory of a computer the user is accessing to view user interface 800. The user may paste the URL link into a browser to access the invoice for payment.

FIGS. 9A-9D are illustrations of user interfaces for completing transactions, in accordance with an implementation. For example, at a user interface 900, a user may log in to their account via a computing device by accessing a platform that is provided to the computing device by a data processing system (e.g., a client device or network manager 104, shown and described with reference to FIG. 1, a server system, etc.). At a user interface 902, the user may input details of an account the user owns and/or that is registered with the data processing system to pay an invoice. The user may then select an option to submit details to cause the transaction to be completed with the account. In some cases, after submitting the details, the data processing system may transmit a user interface with attributes the user may select. The user may select an attribute from the user interface to cause the data processing system to identify a transaction protocol to use to complete the transaction according to the systems and methods described herein.

At user interface 904, the user may input information (e.g., account information and a value for the transaction) to complete a transaction. The user may select a pay button and the data processing system may transmit a user interface to the computing device being accessed by the user for the user to use to select an attribute for the transaction. The data processing system may receive the inputs by the user including the value of the transaction, the account information of the sending account, and the selected attribute for the transaction. The data processing system can also receive the information identifying the receiving account and/or the system of record storing the receiving account. The data processing system can perform the systems and methods described herein to complete the transaction based on the received information and generate and/or transmit a user interface 906 which includes a notification that the transaction was completed.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of client device 102 or network manager 104) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for improving network traffic to individual subsets of computers, comprising:
   receiving, by a processor, a transaction request comprising an identification of a sending account, an identification of a recipient account, and a value;
   comparing, by the processor, the value to a first threshold identified in one or more rules;
   identifying, by the processor, a first transaction protocol based on the comparing;

identifying, by the processor, a first subset of computers of a plurality of subsets of computers based on the identified first transaction protocol, each of the plurality of subsets of computers corresponding to a different transaction protocol;

identifying, by the processor, a percentage of network packets the processor transmitted across one or more first connections between the processor and the first subset of computers;

determining, by the processor, the identified percentage of network packets is below a second threshold;

responsive to the determining the identified percentage of network packets is below the second threshold, determining, by the processor, a total number of network packets the processor transmitted across the connections between the processor and each of the second subset of computers is above a third threshold;

determining, by the processor, the identified percentage of network packets is above a second threshold;

identifying, by the processor, a second transaction protocol;

adjusting, by the processor, the identified second transaction protocol to the first transaction protocol in response to the determining the total number of network packets is above the third threshold;

adjusting, by the processor, the identified second transaction protocol to the identified first transaction protocol in response to the determining the identified percentage of network packets is above the second threshold;

selecting, by the processor, a second subset of computers of the plurality of subsets of computers based on the identified second transaction protocol; and transmitting, by the processor, a message to each computer of the second subset of computers indicating the transaction request, receipt of the message causing each computer of the second subset of computers to complete a transaction corresponding to the transaction request between the sending account and the recipient account.

2. The method of claim 1, further comprising:
establishing, by the processor, one or more second connections with the second subset of computers prior to the transaction request; and
selecting, by the processor, the one or more second connections between the processor and the second subset of computers responsive to selecting the second subset of computers.

3. The method of claim 2, further comprising:
identifying, by the processor, a timestamp of the transaction request; and
identifying, by the processor, a number of network packets the processor transmitted across the one or more second connections between the processor and the first second subset of computers within a defined time period comprising a time of the timestamp,
wherein identifying the second transaction protocol comprises identifying, by the processor, the second transaction protocol responsive to determining the number of network packets the processor transmitted across the one or more second connections is less than a third threshold.

4. The method of claim 1, further comprising:
rendering, by the processor, a graphical user interface on a computer device associated with the sending account, the graphical user interface comprising one or more selectable options each indicating an attribute of the transaction request; and
receiving, by the processor, a selected option of the one or more selectable options,
wherein comparing the value to the first threshold identified in the one or more rules comprises retrieving, by the processor, the one or more rules from memory responsive to the one or more rules having a stored association with the selected option.

5. The method of claim 1, further comprising:
identifying, by the processor, a timestamp of the transaction request; and
comparing, by the processor, the timestamp to one or more time periods of the one or more rules,
wherein identifying the second transaction protocol comprises identifying, by the processor, the second transaction protocol responsive to the timestamp falling outside of the one or more time periods.

6. The method of claim 1, further comprising:
rendering, by the processor, an identifier of the second transaction protocol on a display of a computing device; and
receiving, by the processor, a selection of the identifier of the second transaction protocol from the computing device,
wherein selecting the second subset of computers comprises selecting, by the processor, the second subset of computers responsive to receiving the selection of the identifier from the computing device.

7. The method of claim 6, further comprising:
labeling, by the processor, a feature vector comprising data regarding the transaction request comprising at least the value with an indication of the selection of the identifier; and
training, by the processor, a machine learning model to predict transaction protocols using the labeled feature vector.

8. The method of claim 1, further comprising:
determining, by the processor, that a system of record storing the recipient account is not in communication with a third subset of computers of the plurality of subsets of computers, the third subset of computers associated with a third transaction protocol,
wherein identifying the second transaction protocol comprises identifying the first second transaction protocol responsive to the determining the system of record is not in the communication with the third subset of computers.

9. A system, the system comprising:
one or more processors configured by machine-readable instructions to:
receive a transaction request comprising an identification of a sending account, an identification of a recipient account, and a value;
compare the value to a first threshold identified in one or more rules;
identify a first transaction protocol based on the comparison;
identify a first subset of computers of a plurality of subsets of computers based on the identified first transaction protocol, each of the plurality of subsets of computers corresponding to a different transaction protocol;
identify a percentage of network packets the processor transmitted across one or more first connections between the processor and the first subset of computers;

determine the identified percentage of network packets is below a second threshold;
responsive to the determining the identified percentage of network packets is below the second threshold, determine a total number of network packets the processor transmitted across the connections between the processor and each of the second subset of computers is above a third threshold;
determine the identified percentage of network packets is above a second threshold;
identify a second transaction protocol;
adjust the identified second transaction protocol to the first transaction protocol in response to the determining the total number of network packets is above the third threshold;
adjust the identified second transaction protocol to the identified first transaction protocol in response to the determining the identified percentage of network packets is above the second threshold;
select a second subset of computers of the plurality of subsets of computers based on the identified second transaction protocol; and
transmit a message to each computer of the second subset of computers indicating the transaction request, receipt of the message causing each computer of the second subset of computers to complete a transaction corresponding to the transaction request between the sending account and the recipient account.

10. The system of claim 9, wherein the one or more processors are further configured to:
establish one or more second connections with the second subset of computers prior to the transaction request; and
select the one or more second connections between the processor and the second subset of computers responsive to selecting the second subset of computers.

11. The system of claim 10, wherein the one or more processors are further configured to:
identify a timestamp of the transaction request; and
identify a number of network packets the processor transmitted across the one or more second connections between the processor and the second subset of computers within a defined time period comprising a time of the timestamp,
wherein the one or more processors are configured to identify the second transaction protocol by identifying the second transaction protocol responsive to determining the number of network packets the processor transmitted across the one or more second connections is less than a third threshold.

12. The system of claim 9, wherein the one or more processors are further configured to:
identify a second percentage of network packets the processor transmitted across one or more second connections between the processor and each of the second subset of computers;
determine the identified second percentage of network packets is below the second threshold; and
responsive to the determining the identified second percentage of network packets is below the second threshold, determine a total number of network packets the processor transmitted across the one or more second connections between the processor and each of the second subset of computers is above a third threshold;
wherein the one or more processors are configured to identify the first second transaction protocol by:

adjusting the identified first transaction protocol from the first transaction protocol to the second transaction protocol in response to the determination that the total number of network packets is above the third threshold.

13. The system of claim 9, wherein the one or more processors are further configured to:
determine the identified percentage of network packets is below a second threshold; and
responsive to the determination that the identified percentage of network packets is below the second threshold, determine a total number of network packets the processor transmitted across the connections between the processor and each of the first subset of computers is below a third threshold;
wherein the one or more processors are configured to identify the first transaction protocol by identifying the first transaction protocol responsive to determining the total number of network packets the processor transmitted across the connections between the processor and each of the first subset of computers is below the third threshold.

14. The system of claim 9, wherein the one or more processors are further configured to:
render a graphical user interface on a computer device associated with the sending account, the graphical user interface comprising one or more selectable options each indicating an attribute of the transaction request; and
receive a selected option of the one or more selectable options,
wherein the one or more processors are configured to compare the value to the threshold identified in the one or more rules by retrieving the one or more rules from memory responsive to the one or more rules having a stored association with the selected option.

15. A non-transitory computer-readable storage medium having instructions embodied thereon, the instructions being executable by one or more processors to perform a method, the method comprising:
receiving a transaction request comprising an identification of a sending account, an identification of a recipient account, and a value;
comparing the value to a threshold identified in one or more rules;
identifying a first transaction protocol based on the comparing;
identifying a first subset of computers of a plurality of subsets of computers based on the identified first transaction protocol, each of the plurality of subsets of computers corresponding to a different transaction protocol;
identifying a percentage of network packets the processor transmitted across one or more first connections between the processor and the first subset of computers;
determining the identified percentage of network packets is below a second threshold;
responsive to the determining the identified percentage of network packets is below the second threshold, determining a total number of network packets the processor transmitted across the connections between the processor and each of the second subset of computers is above a third threshold;
determining the identified percentage of network packets is above a second threshold;
identifying a second transaction protocol;

adjusting the identified second transaction protocol to the first transaction protocol in response to the determining the total number of network packets is above the third threshold;

adjusting the identified second transaction protocol to the identified first transaction protocol in response to the determining the identified percentage of network packets is above the second threshold;

selecting a second subset of computers of the plurality of subsets of computers based on the identified second transaction protocol; and transmitting a message to each computer of the first subset of computers indicating the transaction request, receipt of the message causing each computer of the first subset of computers to complete a transaction corresponding to the transaction request between the sending account and the recipient account.

16. The non-transitory computer-readable storage medium of claim 15, the method further comprising:

establishing one or more second connections with the second subset of computers prior to the transaction request; and selecting the one or more second connections between the processor and the second subset of computers responsive to selecting the second subset of computers.

* * * * *